(12) United States Patent
Huang et al.

(10) Patent No.: US 11,874,439 B2
(45) Date of Patent: Jan. 16, 2024

(54) OPTICAL IMAGING LENS INCLUDING SEVEN LENSES OF --++-+-, -+++-+- OR --++-++ REFRACTIVE POWERS

(71) Applicant: ZHEJIANG SUNNY OPTICAL CO., LTD, Zhejiang (CN)

(72) Inventors: Wenbo Huang, Zhejiang (CN); Lingbo He, Zhejiang (CN); Fujian Dai, Zhejiang (CN); Liefeng Zhao, Zhejiang (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 501 days.

(21) Appl. No.: 17/037,725

(22) Filed: Sep. 30, 2020

(65) Prior Publication Data

US 2021/0173186 A1    Jun. 10, 2021

(30) Foreign Application Priority Data

Dec. 10, 2019   (CN) .......................... 201911260532.8

(51) Int. Cl.
*G02B 13/00*   (2006.01)
*G02B 9/64*    (2006.01)

(52) U.S. Cl.
CPC ........... *G02B 13/0045* (2013.01); *G02B 9/64* (2013.01)

(58) Field of Classification Search
CPC ............................. G02B 13/0045; G02B 9/64
See application file for complete search history.

(56) References Cited

U.S. PATENT DOCUMENTS

2020/0012078 A1 * 1/2020 Kuo .......................... G02B 9/64

FOREIGN PATENT DOCUMENTS

| CN | 1650213 | A |   | 8/2005  |             |
|----|---------|---|---|---------|-------------|
| CN | 107305275 | A | * | 10/2017 | ......... G02B 13/0045 |
| CN | 107367827 | A |   | 11/2017 |             |
| CN | 107728290 | A |   | 2/2018  |             |
| CN | 109709660 | A |   | 5/2019  |             |
| CN | 209215714 | A |   | 8/2019  |             |

(Continued)

OTHER PUBLICATIONS

CN-107305275-A, translation (Year: 2017).*

(Continued)

*Primary Examiner* — Wen Huang
(74) *Attorney, Agent, or Firm* — Gang Yu

(57) ABSTRACT

The disclosure discloses an optical imaging lens. The optical imaging lens sequentially includes from an object side to an image side along an optical axis: a first lens having a negative focal power, and provided with an object-side surface, the object-side surface is concave surface; a second lens having a focal power; a third lens having a focal power; a fourth lens having a positive focal power; a fifth lens having a negative focal power, and provided with an image-side surface, the image-side surface is concave surface; a sixth lens having a positive focal power; and a seventh lens having a focal power; at least one aspherical mirror surface is included in the object-side surface of the first lens to an image-side surface of the seventh lens; and a maximum Field of View (FOV) of the optical imaging lens meets $105°\leq FOV\leq 135°$.

10 Claims, 20 Drawing Sheets

(56) References Cited

FOREIGN PATENT DOCUMENTS

| | | |
|---|---|---|
| CN | 211293433 U | 8/2020 |
| CN | 112147750 A | 12/2020 |
| JP | 2010170045 A | 8/2010 |

OTHER PUBLICATIONS

Corresponding CN application search results issued on Apr. 20, 2021.
Corresponding CN application search results issued on Nov. 29, 2021.

* cited by examiner

OPTICAL IMAGING LENS INCLUDING SEVEN LENSES OF −−++−+−, −+++−+− OR −−++−++ REFRACTIVE POWERS

CROSS-REFERENCE TO RELATED APPLICATIONS

The present application claims priority to Chinese Patent Application No. 201911260532.8, filed to the National Intellectual Property Administration, PRC (CNIPA) on Dec. 10, 2019, the disclosure of which is hereby incorporated by reference in its entirety.

TECHNICAL FIELD

The disclosure relates to the field of optical components, and more particularly, to an optical imaging lens.

BACKGROUND

With the upgrade and update of portable devices as well as the development of image software functions and video software functions on the portable devices, the level of hardware on these devices is also improved constantly. Mobile phones and other portable devices are typically provided with a camera module to obtain a photographing function. The camera module is often provided with a Charge-coupled Device (CCD) image sensor or a Complementary Metal Oxide Semiconductor (CMOS) image sensor, and further provided with an optical imaging lens. The optical imaging lens can gather light rays on an object side, and the imaging light rays travel along an optical path of the optical imaging lens and are irradiated onto the image sensor; and then, the image sensor converts an optical signal into an electrical signal to form an image data.

While the portable devices, typically represented by the mobile phones, are increasingly going after an ultra-thin thickness, various components thereon are compressed continuously in size, and the total optical length of the camera module is also limited to a great extent. With the limited size, a good optical performance is still desirable.

In order to meet the miniaturization requirement and the imaging requirement, an optical imaging lens capable of considering miniaturization, an ultra-wide field and high imaging quality is needed.

SUMMARY

Some embodiments of the disclosure provides an optical imaging lens which may be applied to portable electronic products, and may at least solve or partially solve at least one of the above shortcomings in a related art.

One embodiment of the disclosure discloses an optical imaging lens. The optical imaging lens sequentially includes from an object side to an image side along an optical axis: a first lens having a negative focal power, and provided with an object-side surface, the object-side surface is concave surface; a second lens having a focal power; a third lens having a focal power; a fourth lens having a positive focal power; a fifth lens having a negative focal power, and provided with an image-side surface, the image-side surface is concave surface; a sixth lens having a positive focal power; and a seventh lens having a focal power.

In an implementation mode, at least one aspherical mirror surface is included in the object-side surface of the first lens to an image-side surface of the seventh lens.

In an implementation mode, a maximum FOV of the optical imaging lens meets $105°≤FOV≤135°$.

In an implementation mode, an effective focal length f1 of the first lens, an effective focal length f5 of the fifth lens, a curvature radius R1 of the object-side surface of the first lens and a curvature radius R5 of an object-side surface of the third lens meet $1.0<(f1+f5)/(R1−R5)<1.4$.

In an implementation mode, an effective focal length f4 of the fourth lens, an effective focal length f6 of the sixth lens, and a total effective focal length f of the optical imaging lens meet $2.5<(f4+f6)/f<3.2$.

In an implementation mode, an effective focal length f3 of the third lens, a curvature radius R5 of an object-side surface of the third lens and a curvature radius R6 of an image-side surface of the third lens meet $1.3<f3/(R5+R6)<2.3$.

In an implementation mode, a curvature radius R11 of an object-side surface of the sixth lens, a curvature radius R12 of an image-side surface of the sixth lens, a curvature radius R13 of an object-side surface of the seventh lens, and a curvature radius R14 of an image-side surface of the seventh lens meet $0.2<(R11+R12)/(R13+R14)<1.5$.

In an implementation mode, a central thickness CT1 of the first lens on the optical axis, a central thickness CT2 of the second lens on the optical axis, and a central thickness CT3 of the third lens on the optical axis meet $0.6<CT1/(CT2+CT3)<1.1$.

In an implementation mode, the optical imaging lens further includes a diaphragm disposed at the optical axis, and a distance SL on the optical axis from the diaphragm to an imaging surface of the optical imaging lens and a distance TTL on the optical axis from the object-side surface of the first lens to the imaging surface meet $0.4<SL/TTL<0.7$.

In an implementation mode, a synthetic focal length f23 for the second lens and the third lens, and a synthetic focal length f56 for the fifth lens and the sixth lens meet $0.5<f56/f23<1.3$.

In an implementation mode, an on-axis distance SAG42 from an intersection between an image-side surface of the fourth lens and the optical axis to an effective radius vertex on the image-side surface of the fourth lens, an on-axis distance SAG51 from an intersection between an object-side surface of the fifth lens and the optical axis to an effective radius vertex on the object-side surface of the fifth lens, and an on-axis distance SAG62 from an intersection between an image-side surface of the sixth lens and the optical axis to an effective radius vertex on the image-side surface of the sixth lens meet $0.6<SAG62/(SAG42+SAG51)<1.2$.

In an implementation mode, a central thickness CT7 of the seventh lens on the optical axis, an on-axis distance SAG71 from an intersection between an object-side surface of the seventh lens and the optical axis to an effective radius vertex on the object-side surface of the seventh lens, and an on-axis distance SAG72 from an intersection between an image-side surface of the seventh lens and the optical axis to an effective radius vertex on the image-side surface of the seventh lens meet $1.0<(SAG72−SAG71)/CT7<2.4$.

In an implementation mode, an effective semi-diameter DT11 of the object-side surface of the first lens and an effective semi-diameter DT72 of the image-side surface of the seventh lens meet $1.0<DT11/DT72<1.5$.

According to the disclosure, with the adoption of seven lenses, and by reasonably distributing the optical focal power and surface type of each lens, the central thickness of each lens, the on-axis distance between the lens and the like, the optical imaging lens has at least one beneficial effect of miniaturization, ultra-wide field and high imaging quality.

BRIEF DESCRIPTION OF THE DRAWINGS

Detailed descriptions are made to unrestrictive implementation modes below in combination with the drawings to make the other characteristics, purposes and advantages of the disclosure more apparent. In the accompanying drawings: In the drawings.

DETAILED DESCRIPTION OF THE EMBODIMENTS

Figure 1:
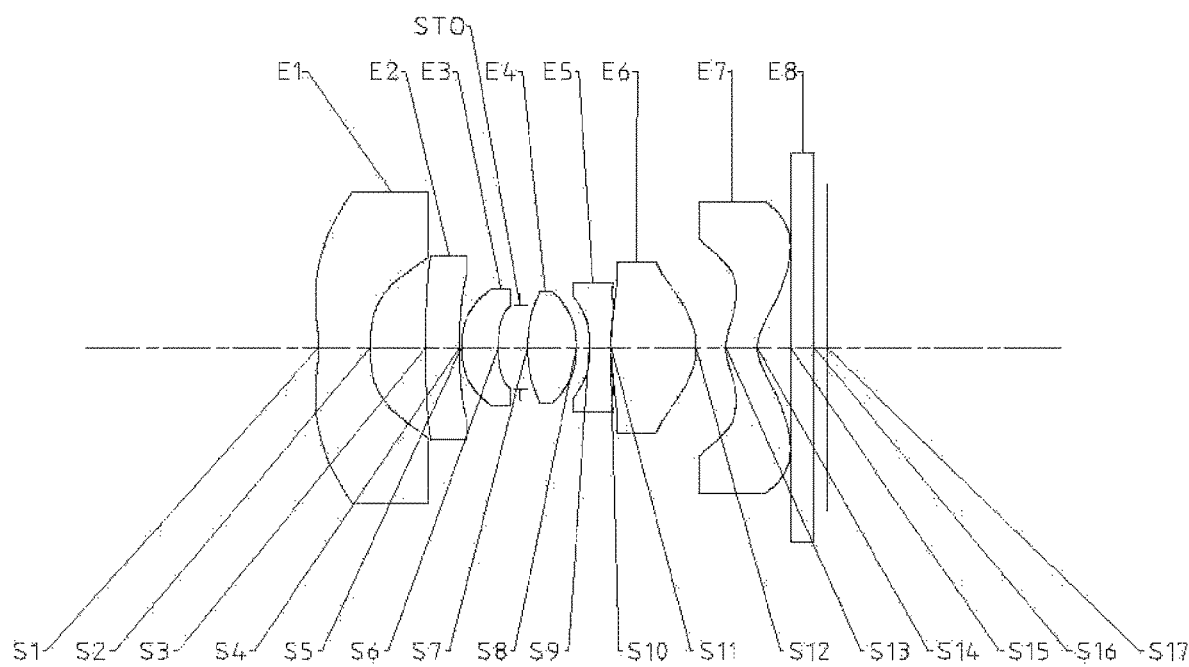
FIG. 1 shows a structure diagram of an optical imaging lens according to embodiment 1 of the disclosure.

For understanding the present disclosure better, more detailed descriptions will be made to each aspect of the present disclosure with reference to the drawings. It is to be understood that these detailed descriptions are only descriptions about the exemplary implementation modes of the present disclosure and not intended to limit the scope of the present disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the present disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the present disclosure are described, "may" is used to represent "one or more implementation modes of the present disclosure". Furthermore, term "exemplary" refers to an example or exemplary description.

Unless otherwise defined, all terms (including technical terms and scientific terms) used in the present disclosure have the same meanings usually understood by the general technical personnel in the field of the present disclosure. It also should be understood that the terms (for example, terms defined in a common dictionary) should be explained to have meanings consistent with the meanings in the context of correlation technique and cannot be explained with ideal or excessively formal meanings, unless clearly defined like this in the present disclosure.

It should be noted that the embodiments in the present disclosure and features in the embodiments can be combined without conflicts. The present disclosure will be described below with reference to the drawings and in combination with the embodiments in detail.

The features, principles and other aspects of the present disclosure will be described below in detail.

An optical imaging lens according to an exemplary implementation mode of the disclosure may include seven lenses with focal power, i.e., a first lens, a second lens, a third lens, a fourth lens, a fifth lens, a sixth lens and a seventh lens. The seven lenses are sequentially arranged from an object side to an image side along an optical axis. Any two adjacent lenses in the first lens to the seventh lens may have an air space between them.

In an exemplary implementation mode, the first lens may have the negative focal power, and an object-side surface thereof may be a concave surface; the second lens may have the positive focal power or negative focal power; the third lens may have the positive focal power or negative focal power; the fourth lens may have the positive focal power; the fifth lens may have the negative focal power, and an image-side surface thereof may be a concave surface; the sixth lens may have the positive focal power; and the seventh lens may have the positive focal power or negative focal power. By reasonably controlling the positive and negative distribution for the focal power of each component of the lens and the curvature of the surface type of the lens, the low-order aberration of the lens is effectively balanced and controlled. The first lens having the negative focal length and provided with the concave object-side surface is advantageous to reduce incident angles of imaging light rays at the edge field of the optical imaging lens. The fourth lens having the positive focal length is beneficial to balance of off-axis aberration, thereby improving the imaging quality of the optical imaging lens. The fifth lens having the negative focal length and provided with the concave image-side surface is advantageous to shorten the total optical length of the optical imaging lens, such that the optical imaging lens tends to be miniaturized. The sixth lens having the positive focal length is beneficial to improving the imaging quality on the axis field of the optical imaging lens.

In the implementation mode of the disclosure, at least one of mirror surfaces of the lenses is an aspherical mirror surface, that is, at least one from the object-side surface of the first lens to an image-side surface of the seventh lens is the aspherical mirror surface. The aspherical mirror surface has the characteristic that the curvature keeps changing from a center of the lens to a periphery of the lens. Unlike a spherical lens with a constant curvature from the center of the lens to the periphery of the lens, an aspherical lens has a better curvature radius characteristic and the advantages of improving distortion aberrations and improving astigmatic aberrations. With adoption of the aspherical lens, the aberrations during imaging may be eliminated as much as possible, thereby improving the imaging quality. Optionally, at least one of the object-side surface and the image-side surface of each of the first lens, the second lens, the third lens, the fourth lens, the fifth lens, the sixth lens and the seventh lens is the aspherical mirror surface. Optionally, both the object-side surface and the image-side surface of each of the third lens, the fourth lens, the fifth lens are the aspherical mirror surfaces. Optionally, both the object-side surface and the image-side surface of each of the first lens, the second lens, the third lens, the fourth lens, the fifth lenses, the sixth lens and the seventh lens are the aspherical mirror surfaces.

In an exemplary implementation mode, the optical imaging lens may further include at least one diaphragm. The diaphragm may be arranged at a proper position as required, for example, between the third lens and the fourth lens.

In an exemplary implementation mode, the optical imaging lens may further include an optical filter for correcting color deviation and/or protective glass for protecting a photosensitive element on the imaging surface.

In an exemplary implementation mode, the optical imaging lens of the disclosure may meet a conditional expression $105° \leq FOV \leq 135°$, the FOV being a maximum FOV of the optical imaging lens. By setting the FOV within the range, the optical imaging lens may have a larger field, and thus the optical imaging lens obtains more object imaging contents.

In an implementation mode, the optical imaging lens of the disclosure may meet a conditional expression $1.0<(f1+f5)/(R1-R5)<1.4$, wherein, the f1 is an effective focal length of the first lens, the f5 is an effective focal length of the fifth lens, the R1 is a curvature radius of the object-side surface of the first lens, and the R5 is a curvature radius of the object-side surface of the third lens. More specifically, the f1, the f5, the R1 and the R5 may further meet $1.1<(f1+f5)/(R1-R5)<1.3$. By matching the f1, the f5, the R1 and the R5, the astigmatism of the optical imaging lens can be effectively controlled, thereby improving the imaging quality of the off-axis field of the optical imaging lens.

In an exemplary implementation mode, the optical imaging lens of the disclosure may meet a conditional expression $2.5<(f4+f6)/f<3.2$, wherein, the f4 is an effective focal length of the fourth lens, the f6 is an effective focal length of the sixth lens, and the f is a total effective focal length of the optical imaging lens. More specifically, the f4, the f6 and the f may further meet $2.53<(f4+f6)/f<3.10$. By controlling a ratio of the sum of the effective focal length of the fourth lens and the effective focal length of the sixth lens to the total effective focal length, a total angle of deflection of the imaging light rays in the edge field at the two lenses is controlled, and thus the sensitivity of the optical imaging lens may be effectively reduced.

In an implementation mode, the optical imaging lens of the disclosure may meet a conditional expression $1.3<f3/(R5+R6)<2.3$, wherein, the f3 is an effective focal length of the third lens, the R5 is a curvature radius of the object-side surface of the third lens, and the R6 is a curvature radius of the image-side surface of the third lens. More specifically, the f3, the R5 and the R6 may further meet $1.31<f3/(R5+R6)<2.28$. By controlling the effective focal length of the third lens and the curvature radius of the two mirror surfaces thereof, the shape of the third lens can be well controlled, and thus the incidence condition of the imaging light rays at the off-axis field on the third lens may be improved.

In an implementation mode, the optical imaging lens of the disclosure may meet a conditional expression $0.2<(R11+R12)/(R13+R14)<1.5$, wherein, the R11 is a curvature radius of the object-side surface of the sixth lens surface, the R12 is a curvature radius of the image-side surface of the sixth lens surface, the R13 is a curvature radius of the object-side surface of the seventh lens surface, and the R14 is a curvature radius of the image-side surface of the seventh lens surface. More specifically, the R11, the R12, the R13 and the R14 may further meet $0.21<(R11+R12)(R13+R14)<1.49$. By matching each mirror surface from the object-side surface of the sixth lens to the image-side surface of the seventh lens, the focal power of the sixth lens and the focal power of the seventh lens are well distributed, and the off-axis aberrations such as field curvature and comatic aberration in the edge field are improved.

In an implementation mode, the optical imaging lens of the disclosure may meet a conditional expression $0.6<CT1/(CT2+CT3)<1.1$, wherein, the CT1 is a central thickness of the first lens, the CT2 is a central thickness of the second lens, and the CT3 is a central thickness of the third lens. More specifically, the CT1, the CT2 and the CT3 may further meet $0.63<CT1/(CT2+CT3)<1.08$. By controlling the central thickness of each lens from the first lens to the third lens, the distortion of the optical imaging lens can be well controlled, and at last the distortion of the optical imaging lens is limited.

In an implementation mode, the optical imaging lens of the disclosure further includes a diaphragm disposed at the optical axis, and the optical imaging lens may meet a conditional expression 0.4<SL/TTL<0.7, wherein, the SL is a distance on the optical axis between the diaphragm and an imaging surface of the optical imaging lens, and the TTL is a distance on the optical axis from the object-side surface of the first lens to the imaging surface. More specifically, the SL and the TTL may further meet 0.49<SL/TTL<0.62. By limiting the position of the diaphragm on the optical axis, the length of the optical imaging lens can be effectively controlled, and the optical imaging lens is miniaturized.

In an implementation mode, the optical imaging lens of the disclosure may meet a conditional expression 0.5<f56/f23<1.3, wherein, the f23 is a synthetic focal length for the second lens and the third lens, and the f56 is a synthetic focal length for the fifth lens and the sixth lens. More specifically, the f23 and the f56 may further meet 0.52<f56/f23<1.29. By controlling a ratio of the synthetic focal length for the fifth lens and the sixth lens to the synthetic focal length for the third lens and the fourth lens, the focal power of each lens can be effectively distributed, and the on-axis aberrations and the off-axis aberrations of the optical imaging lens are corrected.

In an implementation mode, the optical imaging lens of the disclosure may meet a conditional expression 0.6<SAG62/(SAG42+SAG51)<1.2, wherein, the SAG42 is an on-axis distance from an intersection between the image-side surface of the fourth lens and the optical axis to an effective radius vertex on the image-side surface of the fourth lens, the SAG51 is an on-axis distance from an intersection between the object-side surface of the fifth lens and the optical axis to an effective radius vertex on the object-side surface of the fifth lens, and the SAG62 is an on-axis distance from an intersection between the image-side surface of the sixth lens and the optical axis to an effective radius vertex on the image-side surface of the sixth lens. More specifically, the SAG42, the SAG51 and the SAG62 may further meet 0.65<SAG62/(SAG42+SAG51)<1.2. By matching the rise of the image-side surface of the fourth lens, the rise of the object-side surface of the fifth lens and the rise of the image-side surface of the sixth lens, the shapes of the fourth lens, fifth lens and sixth lens can be effectively controlled, the shape of the seventh lens may be influenced, and the sensitivity of the optical imaging lens is reduced.

In an implementation mode, the optical imaging lens of the disclosure may meet a conditional expression 1.0<(SAG72−SAG71)/CT7<2.4, wherein, the CT7 is a central thickness of the seventh lens on the optical axis, the SAG71 is an on-axis distance from an intersection between the object-side surface of the seventh lens and the optical axis to an effective radius vertex on the object-side surface of the seventh lens, and the SAG72 is an on-axis distance from an intersection between the image-side surface of the seventh lens and the optical axis to an effective radius vertex on the image-side surface of the seventh lens. More specifically, the CT7, the SAG71 and the SAG72 may further meet 1.05<(SAG72−SAG71)/CT7<2.34. By controlling the difference between rises of two mirror surfaces of the seventh lens to the central thickness, the machine shaping of the seventh lens is facilitated, the sensitivity of the optical imaging lens is reduced, and the relationship between the miniaturization of the optical imaging lens and relative illumination of the off-axis field is better balanced.

In an implementation mode, the optical imaging lens of the disclosure may meet a conditional expression 1.0<DT11/DT72<1.5, wherein, the DT11 is an effective semi-diameter of the object-side surface of the first lens, and the DT72 is an effective semi-diameter of the image-side surface of the seventh lens. By controlling a ratio of the effective semi-diameter of the object-side surface of the first lens to the effective semi-diameter of the image-side surface of the seventh lens, the maximum diameter of the first lens and the maximum diameter of the seventh lens are controlled, each lens is better matched with a lens cone, and each lens has good assembly usability.

The optical imaging lens according to the above implementation manner of the disclosure may use multiple lenses, such as the seven lenses. By reasonably distributing the focal power and surface type of each lens, the central thickness of each lens, the on-axis distance of each lens and the like, the size of the imaging lens can be effectively shortened, the sensitivity of the imaging lens is reduced, and the machinability of the imaging lens is improved; and therefore, the optical imaging lens is more beneficial to production and can be adapted for portable electronic products. Furthermore, the optical imaging lens of the disclosure further has an ultra-wide field, high imaging quality and other excellent optical performances.

However, those skilled in the art should know that the number of the lenses forming the optical imaging lens may be changed without departing from the technical solutions claimed in the disclosure to achieve each result and advantage described in the specification. For example, although descriptions are made in the implementation with seven lenses as an example, the optical imaging lens is not limited to seven lenses. If necessary, the optical imaging lens may further include another number of lenses.

Specific embodiments of the optical imaging lens applied to the above-mentioned implementation mode will further be described below with reference to the drawings.

Embodiment 1

The optical imaging lens according to embodiment 1 of the disclosure will be described below with reference to FIG. 1 to FIG. 2D. FIG. 1 is a structure diagram of an optical imaging lens according to embodiment 1 of the disclosure.

As shown in FIG. 1, an optical imaging lens sequentially includes from an object side to an image side along an optical axis: a first lens E1, a second lens E2, a third lens E3, a diaphragm STO, a fourth lens E4, a fifth lens E5, a sixth lens E6, a seventh lens E7 and an optical filter E8.

The first lens E1 has a negative focal power, an object-side surface S1 thereof is a concave surface, and an image-side surface S2 is a concave surface. The second lens E2 has a negative focal power, an object-side surface S3 thereof is a convex surface, and an image-side surface S4 is a concave surface. The third lens E3 has a positive focal power, an object-side surface S5 thereof is a convex surface, and an image-side surface S6 is a concave surface. The fourth lens E4 has a positive focal power, an object-side surface S7 thereof is a convex surface, and an image-side surface S8 is a convex surface. The fifth lens E5 has a negative focal power, an object-side surface S9 thereof is a concave surface, and an image-side surface S10 is a concave surface. The sixth lens E6 has a positive focal power, an object-side surface S11 thereof is a convex surface, and an image-side surface S12 is a convex surface. The seventh lens E7 has a negative focal power, an object-side surface S13 thereof is a convex surface, and an image-side surface S14 is a concave surface. The optical filter E8 has an object-side surface S15 and an image-side surface S16. The optical imaging lens is provided with an imaging surface S17. Light from an object sequentially penetrates through each of the surfaces S1 to S16 and is finally imaged on the imaging surface S17.

Table 1 shows basic parameters of the optical imaging lens of embodiment 1, in which the units of curvature radius, thickness/distance and focal length are millimeter (mm).

TABLE 1

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Aspherical | −2.9806 | 0.6643 | 1.54 | 55.7 | −3.21 | −39.8210 |
| S2 | Aspherical | 4.4120 | 0.7090 | | | | 8.4234 |
| S3 | Aspherical | 22.5914 | 0.4342 | 1.65 | 23.5 | −28.33 | 99.0000 |
| S4 | Aspherical | 10.0128 | 0.0237 | | | | 65.1458 |
| S5 | Aspherical | 1.5570 | 0.4703 | 1.65 | 23.5 | 5.99 | 1.5006 |
| S6 | Aspherical | 2.3029 | 0.2801 | | | | 4.6180 |
| STO | Spherical | Infinite | 0.0948 | | | | |
| S7 | Aspherical | 2.4793 | 0.6237 | 1.55 | 56.1 | 2.16 | −0.3948 |
| S8 | Aspherical | −2.0470 | 0.1733 | | | | 1.0754 |
| S9 | Aspherical | −7.4870 | 0.2746 | 1.67 | 20.4 | −2.40 | 4.9186 |
| S10 | Aspherical | 2.0638 | 0.0103 | | | | −19.6973 |
| S11 | Aspherical | 3.3672 | 1.0843 | 1.55 | 56.1 | 1.91 | −15.9068 |
| S12 | Aspherical | −1.3398 | 0.3830 | | | | −0.2060 |
| S13 | Aspherical | 0.9505 | 0.4002 | 1.54 | 55.7 | −8.47 | −5.9928 |
| S14 | Aspherical | 0.6706 | 0.4286 | | | | −2.9631 |
| S15 | Spherical | Infinite | 0.3000 | 1.52 | 64.2 | | |
| S16 | Spherical | Infinite | 0.1690 | | | | |
| S17 | Spherical | Infinite | | | | | |

In the embodiment 1, the total effective focal length f of the optical imaging lens is 1.53 mm, the on-axis distance TTL from the object-side surface S1 of the first lens E1 to the imaging surface S17 is 6.52 mm, and ImgH is the half of the length of the diagonal line in the effective pixel region on the imaging surface S17, ImgH is 2.57 mm.

In embodiment 1, both the object-side surface and image-side surface of any lens in the first lens E1 to the seventh lens E7 are aspherical surfaces, and the surface type x of each aspherical lens may be defined by use of, but not limited to, the following aspherical surface formula:

$$x = \frac{ch^2}{1 + \sqrt{1 - (k+1)c^2 h^2}} + \sum A_i h^i \quad (1)$$

where x is the distance rise between a position of the aspherical surface at a height h in the direction of the optical axis and the aspherical surface vertex; c is the paraxial curvature of the aspherical surface, $c = 1/R$ (namely, the paraxial curvature c is a reciprocal of the curvature radius R in Table 1); k is the conic coefficient; and $A_i$ is the i-th-order correction coefficient of the aspherical surface. Table 2 shows the higher-order coefficients $A_4$, $A_6$, $A_8$, $A_{10}$, $A_{12}$, $A_{14}$, $A_{16}$, $A_{18}$ and $A_{20}$ applicable to the aspherical mirror surfaces S1-S14 in embodiment 1.

TABLE 2

| Surface number | A4 | A6 | A8 | A10 | A12 |
|---|---|---|---|---|---|
| S1 | 1.2878E−01 | −9.0740E−02 | 4.8151E−02 | −1.8090E−02 | 4.7130E−03 |
| S2 | 3.6263E−01 | −3.2484E−01 | 1.9433E−01 | −3.8160E−02 | −3.3600E−03 |
| S3 | 3.1865E−02 | −2.5160E−01 | 8.9409E−01 | −1.6918E+00 | 1.8820E+00 |
| S4 | −6.5090E−02 | 3.8548E−01 | −5.2920E−01 | −1.0313E+00 | 4.2674E+00 |
| S5 | −1.3620E−02 | 6.6550E−01 | −2.5010E+00 | 7.1623E+00 | −1.9615E+01 |
| S6 | 2.0454E−01 | −4.0620E−02 | 3.0678E+00 | −2.6238E+01 | 1.4091E+02 |
| S7 | 7.4699E−02 | −2.7490E−01 | 2.3964E+00 | −1.4371E+01 | 4.9116E+01 |
| S8 | −3.5770E−01 | 4.7007E−01 | 1.8332E−01 | −9.2534E+00 | 4.2315E+04 |
| S9 | −9.1560E−01 | 1.2736E+00 | −7.1545E−01 | −9.4034E+00 | 5.0720E+01 |
| S10 | −4.3667E−01 | 6.9690E−01 | −5.9916E−01 | −4.4543E−01 | 1.3695E+00 |
| S11 | −1.1867E−01 | 1.0080E−03 | 9.3140E−01 | −3.6215E+00 | 7.2628E+00 |
| S12 | −2.0915E−01 | 8.7587E−01 | −1.7334E+00 | 2.5212E+00 | −2.4630E+00 |

TABLE 2-continued

| | | | | | |
|---|---|---|---|---|---|
| S13 | −2.2951E−01 | −7.3400E−02 | 4.0412E−01 | −5.5735E−01 | 4.5015E−01 |
| S14 | −2.2482E−01 | 1.8592E−01 | −1.2523E−01 | 6.8972E−02 | −2.9060E−02 |

| Surface number | A14 | A16 | A18 | A20 |
|---|---|---|---|---|
| S1 | −8.3000E−04 | 9.4800E−05 | −6.3000E−06 | 1.8400E−07 |
| S2 | −1.1670E−02 | 4.5030E−03 | 2.5550E−03 | −1.0800E−03 |
| S3 | −1.2792E+00 | 5.2573E−01 | −1.2058E−01 | 1.1895E−02 |
| S4 | −5.9311E+00 | 4.2317E+00 | −1.5631E+00 | 2.3809E−01 |
| S5 | 4.0133E+01 | −4.9157E+01 | 3.1805E+01 | −8.5834E+00 |
| S6 | −4.7793E+02 | 1.0642E+03 | −1.4037E+03 | 8.1347E+02 |
| S7 | −1.0242E+02 | 1.3020E+02 | −9.2939E+01 | 2.8693E+01 |
| S8 | −1.0390E+02 | 1.5003E+02 | −1.1645E+02 | 3.7012E+01 |
| S9 | −1.4116E+02 | 2.3280E+02 | −2.0432E+02 | 7.2292E+01 |
| S10 | 3.6631E−01 | −3.0911E+00 | 2.9585E+00 | −9.2053E−01 |
| S11 | −8.4469E+00 | 5.7366E+00 | −2.1112E+00 | 3.2423E−01 |
| S12 | 1.5531E+00 | −5.9679E−01 | 1.2536E−01 | −1.0880E−02 |
| S13 | −2.3432E−01 | 7.5520E−02 | −1.3400E−02 | 9.8800E−04 |
| S14 | 8.5030E−03 | −1.5900E−03 | 1.6700E−04 | −7.5000E−06 |

Figure 2A:
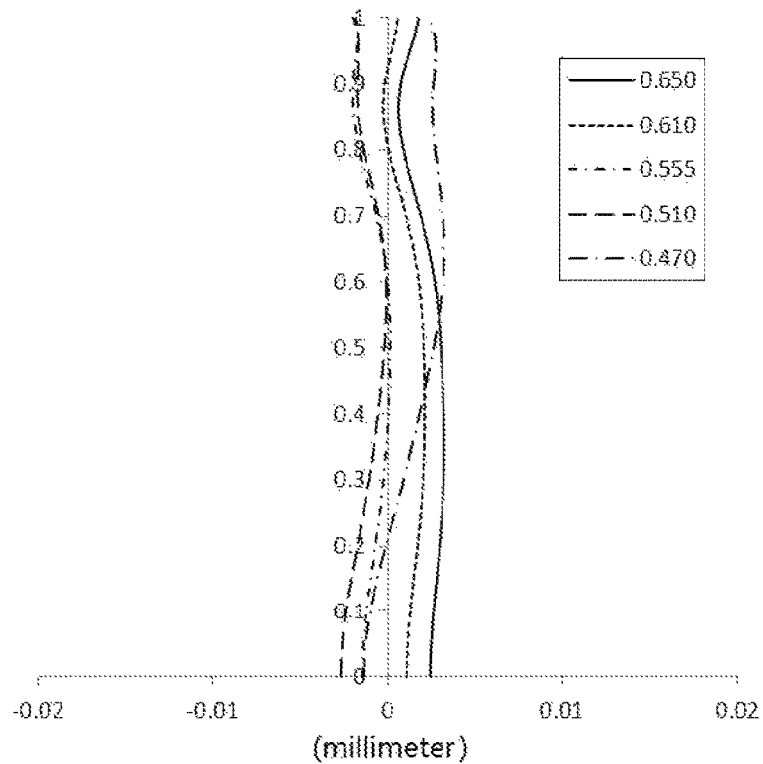
FIG. 2A to FIG. 2D show a longitudinal aberration curve, an astigmatism curve, a distortion curve and a lateral color curve of an optical imaging lens according to embodiment 1 respectively.
Figure 2B:
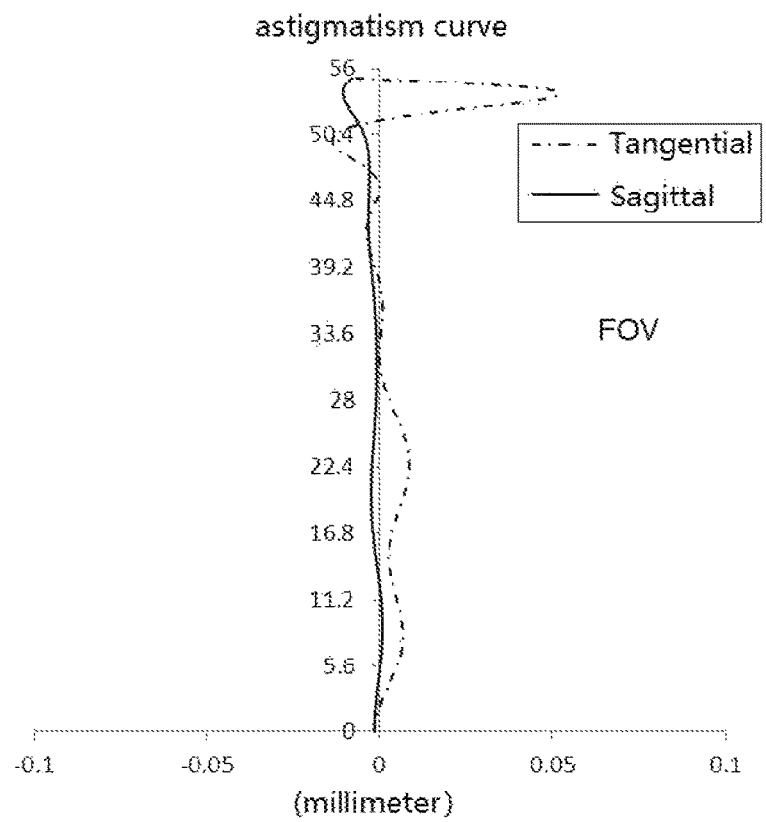
Figure 2C:
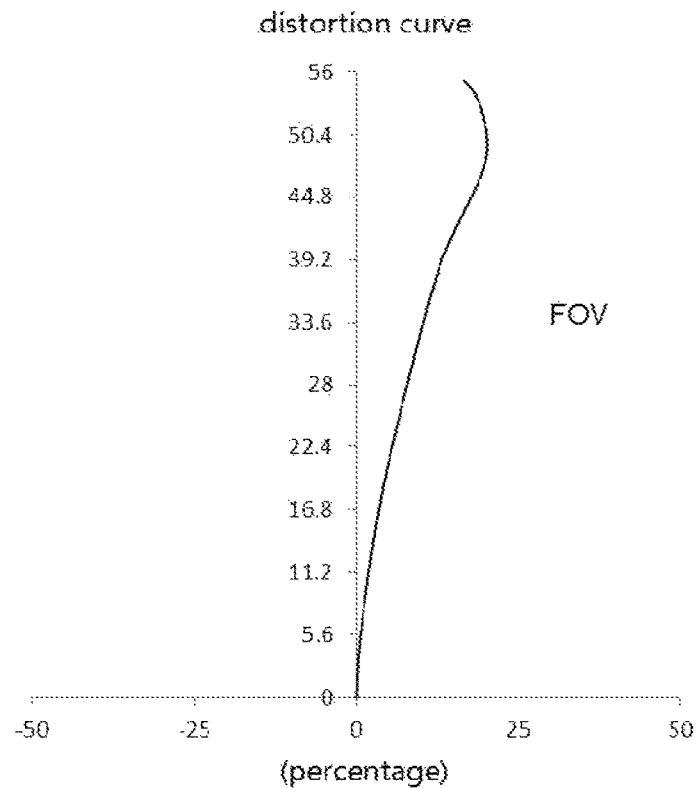
Figure 2D:
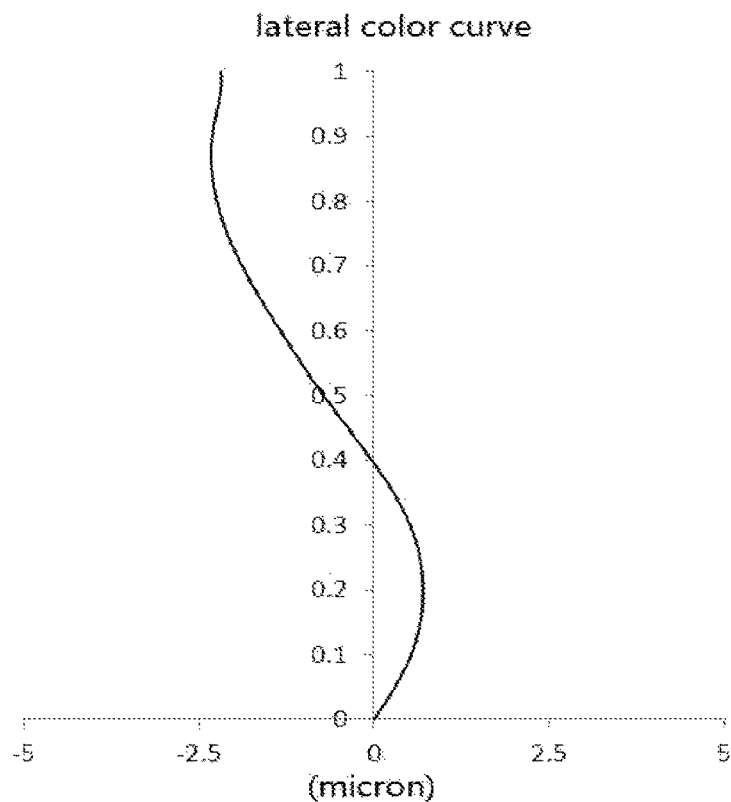

FIG. 2A illustrates a longitudinal aberration curve of the optical imaging lens according to embodiment 1 to represent deviation of a convergence focal point after light with different wavelengths passes through the lens. FIG. 2B illustrates an astigmatism curve of the optical imaging lens according to embodiment 1 to represent a meridian image surface curvature and a sagittal image surface curvature. FIG. 2C illustrates a distortion curve of the optical imaging lens according to embodiment 1 to represent distortion values corresponding to different FOVs. FIG. 2D illustrates a lateral color curve of the optical imaging lens according to embodiment 1 to represent deviation of different image heights on the imaging surface after the light passes through the lens. According to FIG. 2A to FIG. 2D, it can be seen that the optical imaging lens provided in embodiment 1 may achieve high imaging quality.

Embodiment 2

Figure 3:
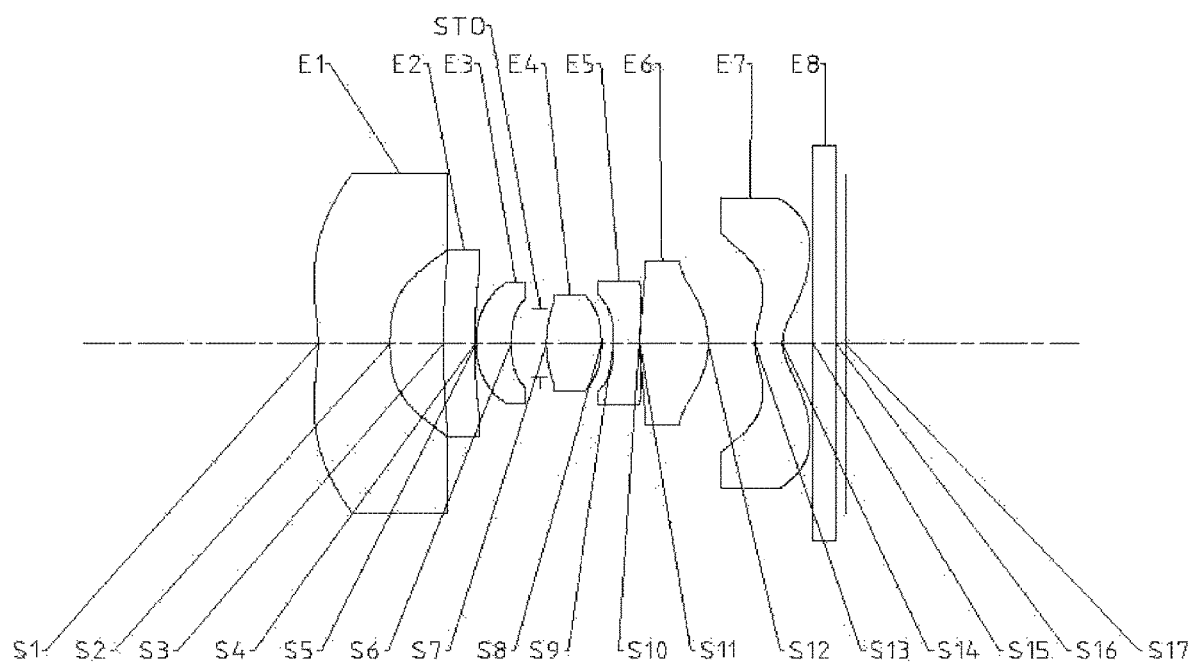
FIG. 3 shows a structure diagram of an optical imaging lens according to embodiment 2 of the disclosure.

The optical imaging lens according to embodiment 2 of the disclosure will be described below with reference to FIG. 3 to FIG. 4D. In the embodiment and the following embodiments, for the ease of clarity, a part of descriptions similar to embodiment 1 are omitted. FIG. 3 is a structure diagram of the optical imaging lens according to embodiment 2 of the disclosure.

As shown in FIG. 3, an optical imaging lens sequentially includes from an object side to an image side along an optical axis: a first lens E1, a second lens E2, a third lens E3, a diaphragm STO, a fourth lens E4, a fifth lens E5, a sixth lens E6, a seventh lens E7 and an optical filter E8.

The first lens E1 has a negative focal power, an object-side surface S1 thereof is a concave surface, and an image-side surface S2 is a concave surface. The second lens E2 has a positive focal power, an object-side surface S3 thereof is a convex surface, and an image-side surface S4 is a concave surface. The third lens E3 has a positive focal power, an object-side surface S5 thereof is a convex surface, and an image-side surface S6 is a concave surface. The fourth lens E4 has a positive focal power, an object-side surface S7 thereof is a convex surface, and an image-side surface S8 is a convex surface. The fifth lens E5 has a negative focal power, an object-side surface S9 thereof is a concave surface, and an image-side surface S10 is a concave surface. The sixth lens E6 has a positive focal power, an object-side surface S11 thereof is a convex surface, and an image-side surface S12 is a convex surface. The seventh lens E7 has a negative focal power, an object-side surface S13 thereof is a convex surface, and an image-side surface S14 is a concave surface. The optical filter E8 has an object-side surface S15 and an image-side surface S16. The optical imaging lens is provided with an imaging surface S17. Light from an object sequentially penetrates through each of the surfaces S1 to S16 and is finally imaged on the imaging surface S17.

In the embodiment 2, the total effective focal length f of the optical imaging lens is 1.60 mm, the on-axis distance TTL from the object-side surface S1 of the first lens E1 to the imaging surface S17 is 6.75 mm, and ImgH is the half of the length of the diagonal line in the effective pixel region on the imaging surface S17, ImgH is 2.57 mm.

Table 3 shows basic parameters of the optical imaging lens of embodiment 2, in which the units of curvature radius, thickness/distance and focal length are millimeter (mm). Table 4 shows high-order coefficients applied to each aspherical mirror surface in embodiment 2. A surface type of each aspherical surface may be defined by formula (1) given in embodiment 1.

TABLE 3

| | | | | Material | | | |
|---|---|---|---|---|---|---|---|
| Surface number | Surface type | Curvature radius | Thickness/ distance | Refractive index | Abbe number | Focal length | Conic coefficient |
| OBJ | Spherical | Infinite | Infinite | | | | |
| S1 | Aspherical | −2.9732 | 0.9189 | 1.54 | 55.7 | −3.19 | −33.2746 |
| S2 | Aspherical | 4.4821 | 0.6814 | | | | 8.3754 |
| S3 | Aspherical | 15.6324 | 0.4092 | 1.65 | 23.5 | 250.46 | −13.2285 |
| S4 | Aspherical | 17.1342 | 0.0113 | | | | 86.1223 |
| S5 | Aspherical | 1.6621 | 0.4490 | 1.65 | 23.5 | 8.59 | 1.5906 |

TABLE 3-continued

| Surface number | Surface type | Curvature radius | Thickness/ distance | Material Refractive index | Abbe number | Focal length | Conic coefficient |
|---|---|---|---|---|---|---|---|
| S6 | Aspherical | 2.1259 | 0.3708 | | | | 3.4391 |
| STO | Spherical | Infinite | 0.0817 | | | | |
| S7 | Aspherical | 2.1972 | 0.7117 | 1.55 | 56.1 | 2.12 | −0.1335 |
| S8 | Aspherical | −2.1641 | 0.1535 | | | | 1.3913 |
| S9 | Aspherical | −7.3957 | 0.3286 | 1.67 | 20.4 | −2.47 | 38.7377 |
| S10 | Aspherical | 2.1486 | 0.0089 | | | | −23.1952 |
| S11 | Aspherical | 2.9991 | 0.8764 | 1.55 | 56.1 | 1.98 | −27.6339 |
| S12 | Aspherical | −1.5117 | 0.5984 | | | | −0.1195 |
| S13 | Aspherical | 1.0128 | 0.3533 | 1.54 | 55.7 | −6.10 | −5.7551 |
| S14 | Aspherical | 0.6794 | 0.3913 | | | | −2.9852 |
| S15 | Spherical | Infinite | 0.3000 | 1.52 | 64.2 | | |
| S16 | Spherical | Infinite | 0.1104 | | | | |
| S17 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 9.1941E−02 | −5.4010E−02 | 2.4604E−02 | −8.0400E−03 | 1.8540E−03 | −2.9000E−04 | 3.0400E−05 | −1.8000E−06 | 4.9300E−08 |
| S2 | 3.3143E−01 | −3.2301E−01 | 2.9362E−01 | −2.6345E−01 | 2.4753E−01 | −1.6814E−01 | 5.6530E−02 | −4.3700E−03 | −1.1600E−03 |
| S3 | 4.4511E−02 | −3.2783E−01 | 1.0827E+00 | −1.9658E+00 | 2.1242E+00 | −1.4069E+00 | 5.6308E−01 | −1.2546E−01 | 1.1964E−02 |
| S4 | −8.1390E−02 | 6.0891E−01 | −1.5766E+00 | 1.8900E+00 | −7.3163E−01 | −6.4118E−01 | 8.4977E−01 | −3.6464E−01 | 5.7133E−02 |
| S5 | −3.3440E−02 | 8.7858E−01 | −2.9289E+00 | 5.5353E+00 | −8.6919E+00 | 1.4298E+01 | −1.7868E+01 | 1.2491E+01 | −3.7407E+00 |
| S6 | 1.6524E−01 | 1.3488E−01 | 3.3435E−01 | −3.5216E+00 | 1.6469E+01 | −2.1297E+01 | −1.9955E+01 | 8.2108E+01 | −6.8614E+01 |
| S7 | 6.7548E−02 | −5.3872E−01 | 7.6805E+00 | −6.6025E+01 | 3.5421E+02 | −1.2139E+03 | 2.5759E+03 | −3.0741E+03 | 1.5732E+03 |
| S8 | −4.5102E−01 | 6.1930E−01 | −5.2501E−01 | −9.9413E−01 | −3.9873E+00 | 4.0924E+01 | −1.1013E+02 | 1.3574E+02 | −6.5709E+01 |
| S9 | −8.4398E−01 | 9.4577E−01 | −1.6324E+00 | 7.5445E+00 | −3.8453E+01 | 1.1044E+02 | −1.7933E+02 | 1.6736E+02 | −7.0984E+01 |
| S10 | −3.6703E−01 | −6.1970E−02 | 3.3319E+00 | −1.1483E+01 | 1.9305E+01 | −1.7142E+01 | 6.9545E+00 | −7.9420E−02 | −5.7354E−01 |
| S11 | −1.8950E−01 | −2.0589E−01 | 3.7736E+00 | −1.4025E+01 | 2.7366E+01 | −3.1505E+01 | 2.1631E+01 | −8.2320E+00 | 1.3401E+00 |
| S12 | −1.1528E−01 | 5.0725E−01 | −8.4716E−01 | 1.0441E+00 | −8.1043E−01 | 3.2509E−01 | 2.2410E−03 | −5.1610E−02 | 1.2961E−02 |
| S13 | −3.6732E−01 | 2.7287E−02 | 5.5595E−01 | −9.7819E−01 | 8.8791E−01 | −4.8589E−01 | 1.5942E−01 | −2.8630E−02 | 2.1530E−03 |
| S14 | −3.6786E−01 | 4.4990E−01 | −3.8641E−01 | 2.2684E−01 | −9.0340E−02 | 2.3881E−02 | −4.0000E−03 | 3.8500E−04 | −1.6000E−05 |

Figure 4A:
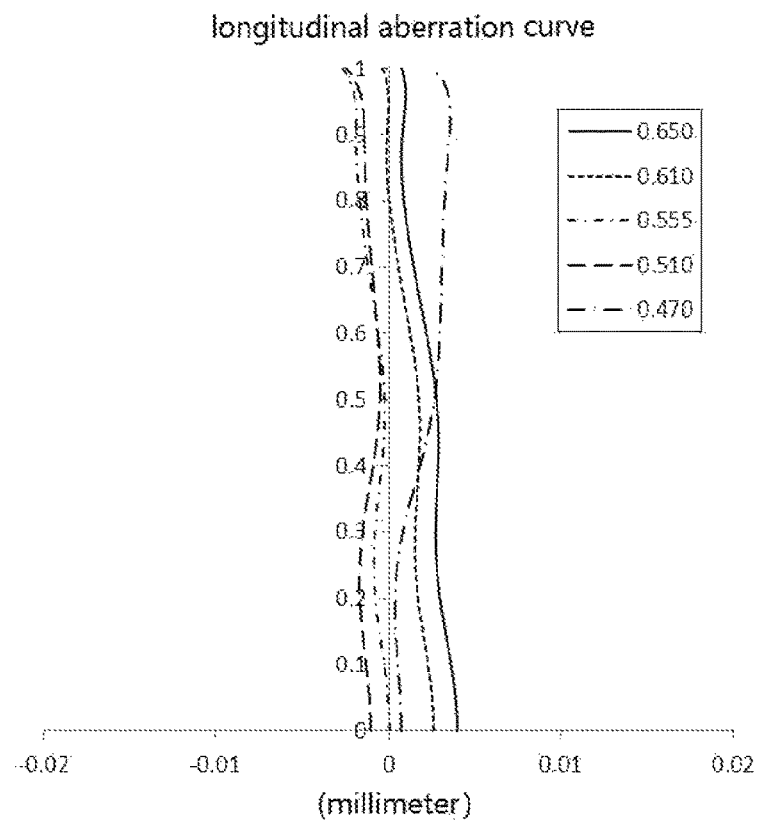
FIG. 4A to FIG. 4D show a longitudinal aberration curve, an astigmatism curve, a distortion curve and a lateral color curve of an optical imaging lens according to embodiment 2 respectively.
Figure 4B:
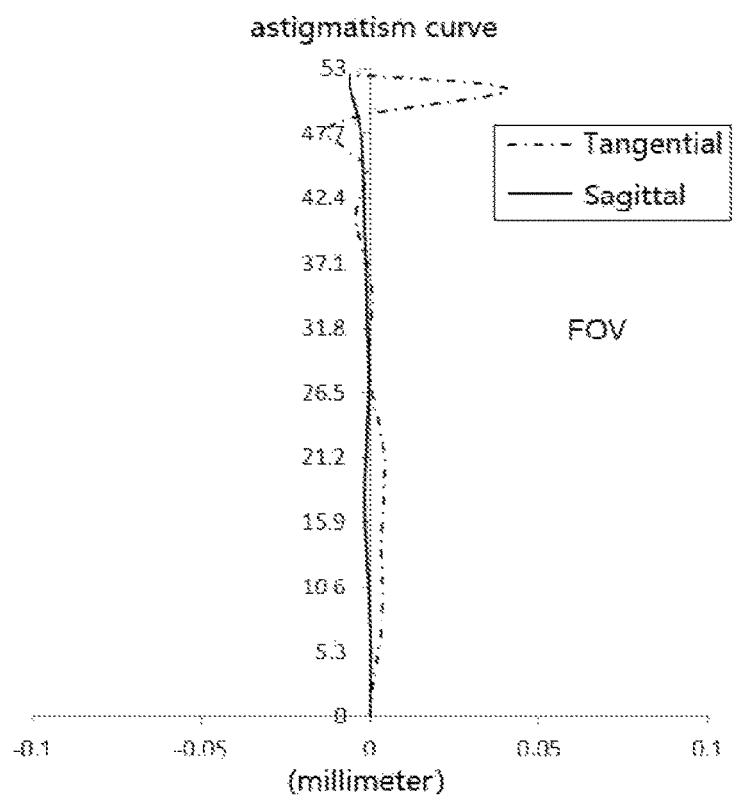
Figure 4C:
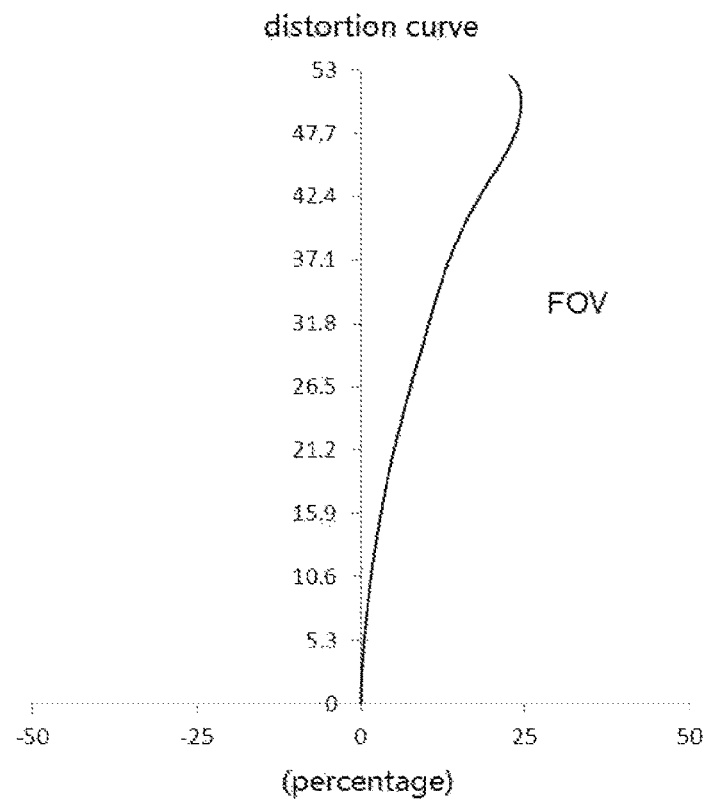
Figure 4D:
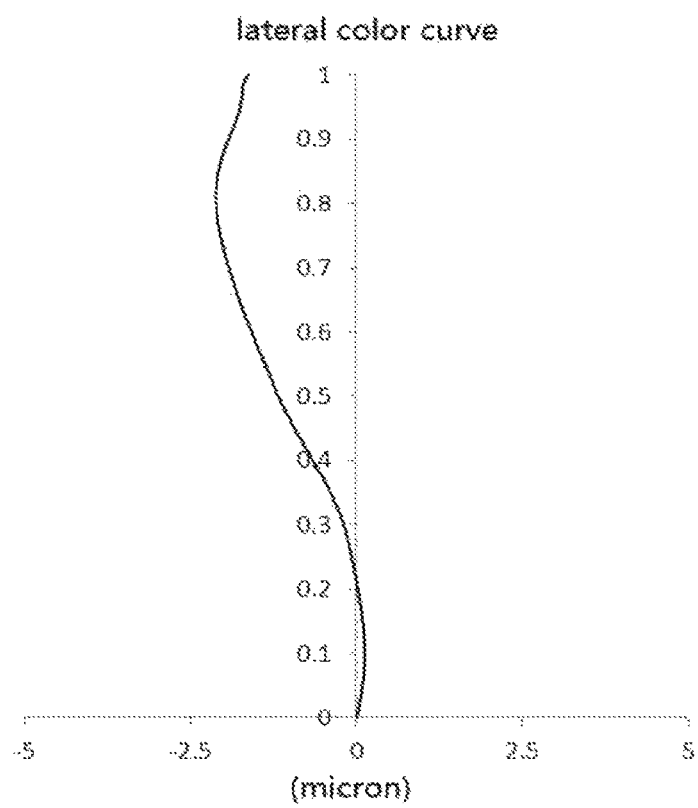

FIG. 4A illustrates a longitudinal aberration curve of the optical imaging lens according to embodiment 2 to represent deviation of a convergence focal point after light with different wavelengths passes through the lens. FIG. 4B illustrates an astigmatism curve of the optical imaging lens according to embodiment 2 to represent a meridian image surface curvature and a sagittal image surface curvature. FIG. 4C illustrates a distortion curve of the optical imaging lens according to embodiment 2 to represent distortion values corresponding to different FOVs. FIG. 4D illustrates a lateral color curve of the optical imaging lens according to embodiment 2 to represent deviation of different image heights on the imaging surface after the light passes through the lens. According to FIG. 4A to FIG. 2D, it can be seen that the optical imaging lens provided in embodiment 2 may achieve high imaging quality.

Embodiment 3

Figure 5:
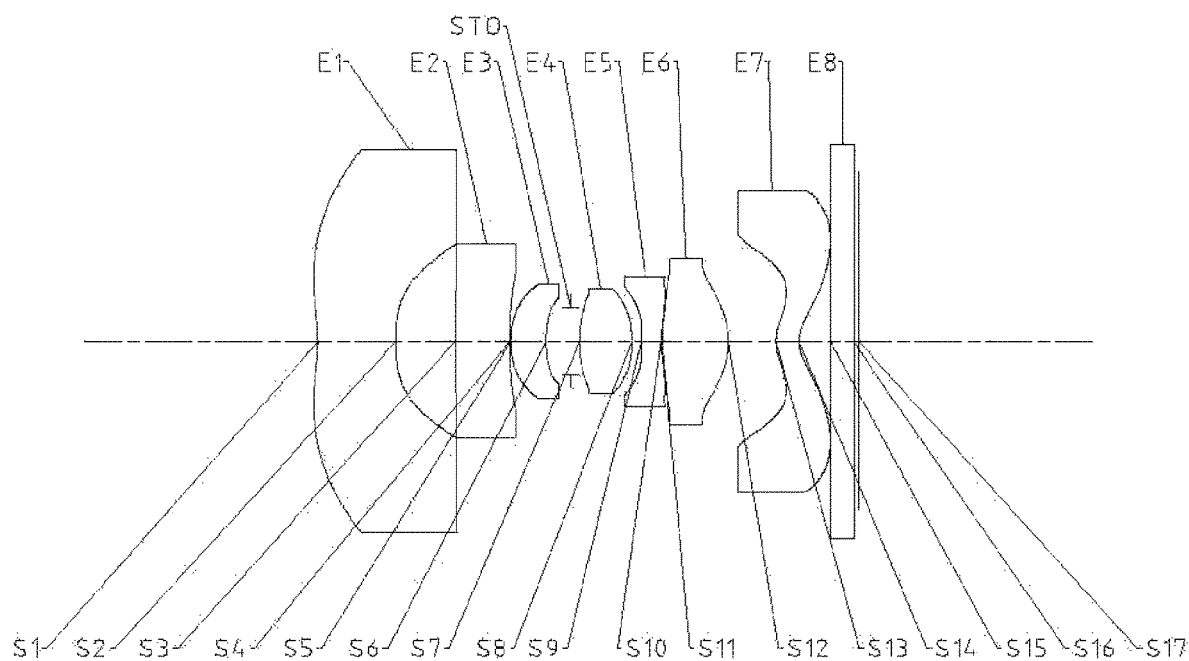
FIG. 5 shows a structure diagram of an optical imaging lens according to embodiment 3 of the disclosure.

The optical imaging lens according to embodiment 3 of the disclosure will be described below with reference to FIG. 5 to FIG. 6D. FIG. 5 is a structure diagram of the optical imaging lens according to embodiment 3 of the disclosure.

As shown in FIG. 5, an optical imaging lens sequentially includes from an object side to an image side along an optical axis: a first lens E1, a second lens E2, a third lens E3, a diaphragm STO, a fourth lens E4, a fifth lens E5, a sixth lens E6, a seventh lens E7 and an optical filter E8.

The first lens E1 has a negative focal power, an object-side surface S1 thereof is a concave surface, and an image-side surface S2 is a concave surface. The second lens E2 has a negative focal power, an object-side surface S3 thereof is a convex surface, and an image-side surface S4 is a concave surface. The third lens E3 has a positive focal power, an object-side surface S5 thereof is a convex surface, and an image-side surface S6 is a concave surface. The fourth lens E4 has a positive focal power, an object-side surface S7 thereof is a convex surface, and an image-side surface S8 is a convex surface. The fifth lens E5 has a negative focal power, an object-side surface S9 thereof is a convex surface, and an image-side surface S10 is a concave surface. The sixth lens E6 has a positive focal power, an object-side surface S11 thereof is a convex surface, and an image-side surface S12 is a convex surface. The seventh lens E7 has a negative focal power, an object-side surface S13 thereof is a convex surface, and an image-side surface S14 is a concave surface. The optical filter E8 has an object-side surface S15 and an image-side surface S16. The optical imaging lens is provided with an imaging surface S17. Light from an object sequentially penetrates through each of the surfaces S1 to S16 and is finally imaged on the imaging surface S17.

In the embodiment 3, the total effective focal length f of the optical imaging lens is 1.41 mm, the on-axis distance TTL from the object-side surface S1 of the first lens E1 to the imaging surface S17 is 6.96 mm, and ImgH is the half of the length of the diagonal line in the effective pixel region on the imaging surface S17, ImgH is 2.57 mm.

Table 5 shows basic parameters of the optical imaging lens of embodiment 3, in which the units of curvature radius, thickness/distance and focal length are millimeter (mm).

Table 6 shows high-order coefficients applied to each aspherical mirror surface in embodiment 3. A surface type of each aspherical surface may be defined by formula (1) given in embodiment 1.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspherical | −2.9384 | 0.9957 | 1.54 | 55.7 | −3.19 | −33.4622 |
| S2 | Aspherical | 4.5788 | 0.7615 | | | | 7.9846 |
| S3 | Aspherical | 26.4268 | 0.7039 | 1.65 | 23.5 | −25.98 | −99.0000 |
| S4 | Aspherical | 10.1340 | 0.0100 | | | | 57.6311 |
| S5 | Aspherical | 1.5571 | 0.4556 | 1.65 | 23.5 | 6.55 | 1.5383 |
| S6 | Aspherical | 2.1857 | 0.3163 | | | | 3.6400 |
| STO | Spherical | Infinite | 0.1154 | | | | |
| S7 | Aspherical | 2.1945 | 0.6761 | 1.55 | 56.1 | 2.20 | −0.4715 |
| S8 | Aspherical | −2.3676 | 0.1251 | | | | 1.4427 |
| S9 | Aspherical | 70.0000 | 0.2535 | 1.67 | 20.4 | −2.41 | −99.0000 |
| S10 | Aspherical | 1.5656 | 0.0118 | | | | −18.8989 |
| S11 | Aspherical | 2.3277 | 0.8480 | 1.55 | 56.1 | 1.85 | −22.6285 |
| S12 | Aspherical | −1.5500 | 0.6151 | | | | −0.1099 |
| S13 | Aspherical | 0.8596 | 0.2945 | 1.54 | 55.7 | −8.62 | −4.2328 |
| S14 | Aspherical | 0.6382 | 0.4035 | | | | −2.6778 |
| S15 | Spherical | Infinite | 0.3000 | 1.52 | 64.2 | | |
| S16 | Spherical | Infinite | 0.0710 | | | | |
| S17 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 8.3833E−02 | −4.5960E−02 | 1.8745E−02 | −5.4100E−03 | 1.0940E−03 | −1.5000E−04 | 1.3700E−05 | −7.3000E−07 | 1.7200E−08 |
| S2 | 3.0503E−01 | −2.6206E−01 | 1.4343E−01 | −7.3900E−03 | −5.9080E−02 | 6.9883E−02 | −4.9790E−02 | 1.8957E−02 | −2.8500E−03 |
| S3 | 3.6377E−02 | −2.1223E−01 | 5.9581E−01 | −9.4353E−01 | 8.9622E−01 | −5.2572E−01 | 1.8786E−01 | −3.7680E−02 | 3.2590E−03 |
| S4 | −1.5272E−01 | 1.2863E+00 | −4.3212E+00 | 8.0484E+00 | −8.9196E+00 | 5.8803E+00 | −2.1608E+00 | 3.5580E−01 | −7.3900E−03 |
| S5 | −1.1765E−01 | 1.3673E+00 | −4.2744E+00 | 6.5770E+00 | −6.1483E+00 | 9.7207E+00 | −1.9088E+01 | 1.9125E+01 | −7.3712E+00 |
| S6 | 1.5915E−01 | −3.0767E−01 | 8.0061E+00 | −6.9698E+01 | 3.6416E+02 | −1.1595E+03 | 2.2635E+03 | −2.5058E+03 | 1.2058E+03 |
| S7 | 5.2217E−02 | −3.3325E−01 | 3.5294E+00 | −2.3273E+01 | 9.4081E+01 | −2.3857E+02 | 3.6991E+02 | −3.1877E+02 | 1.1621E+02 |
| S8 | −5.2250E−01 | 1.0608E+00 | −7.9041E−01 | −8.0570E+00 | 3.4045E+01 | −6.4422E+01 | 6.5669E+01 | −3.1059E+01 | 3.2173E+00 |
| S9 | −1.0998E+00 | 2.0754E+00 | −2.7319E+00 | −2.4605E+00 | 2.0827E+01 | −6.2550E+01 | 1.1773E+02 | −1.1582E+02 | 4.4317E+01 |
| S10 | −4.6804E−01 | 6.4839E−01 | 8.9435E−01 | −7.0736E+00 | 1.7124E+01 | −2.3186E+01 | 1.8894E+01 | −8.6675E+00 | 1.7219E+00 |
| S11 | −2.9508E−01 | 7.6629E−01 | −9.3710E−01 | −7.1299E−01 | 4.6585E+00 | −7.5580E+00 | 6.2768E+00 | −2.7405E+00 | 5.0040E−01 |
| S12 | −1.1439E−01 | 5.4318E−01 | −1.0488E+00 | 1.6128E+00 | −1.9373E+00 | 1.7142E+00 | −9.5865E−01 | 2.8919E−01 | −3.5430E−02 |
| S13 | −3.6458E−01 | 1.0435E−02 | 1.4093E−01 | 7.0166E−02 | −3.0900E−01 | 2.6003E−01 | −1.0123E−01 | 1.9464E−02 | −1.5100E−03 |
| S14 | −3.1367E−01 | 2.6398E−01 | −1.5701E−01 | 7.3968E−02 | −2.8430E−02 | 8.1350E−03 | −1.5300E−03 | 1.6200E−04 | −7.3000E−06 |

Figure 6A:
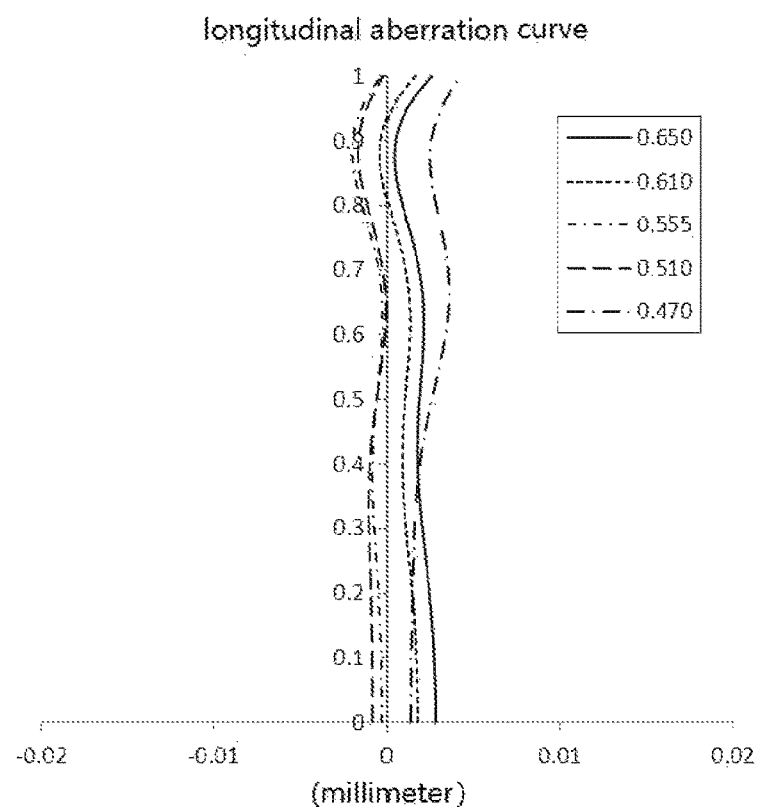
FIG. 6A to FIG. 6D show a longitudinal aberration curve, an astigmatism curve, a distortion curve and a lateral color curve of an optical imaging lens according to embodiment 3 respectively.
Figure 6B:
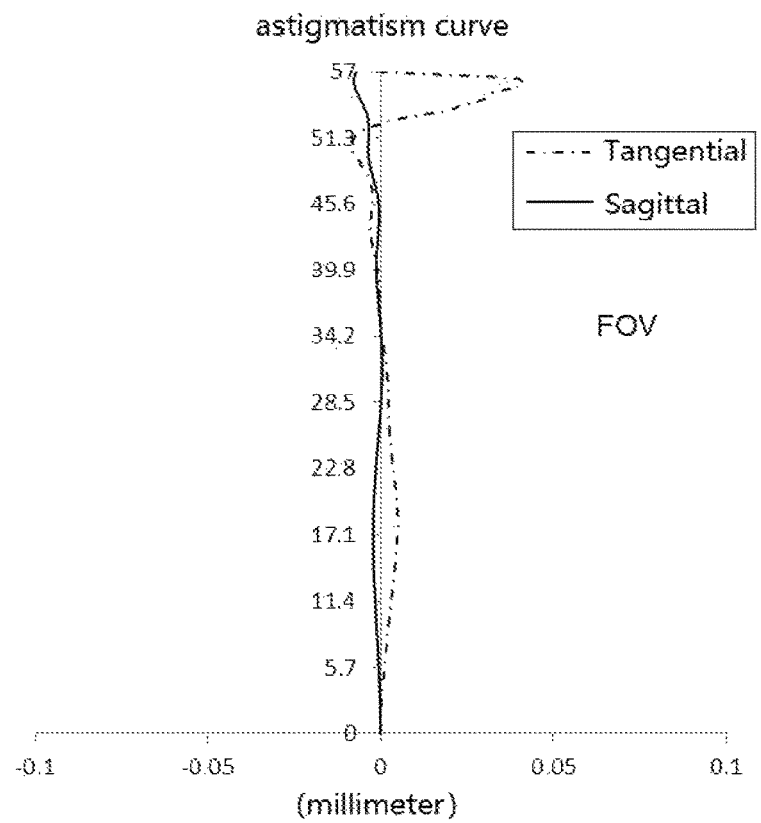
Figure 6C:
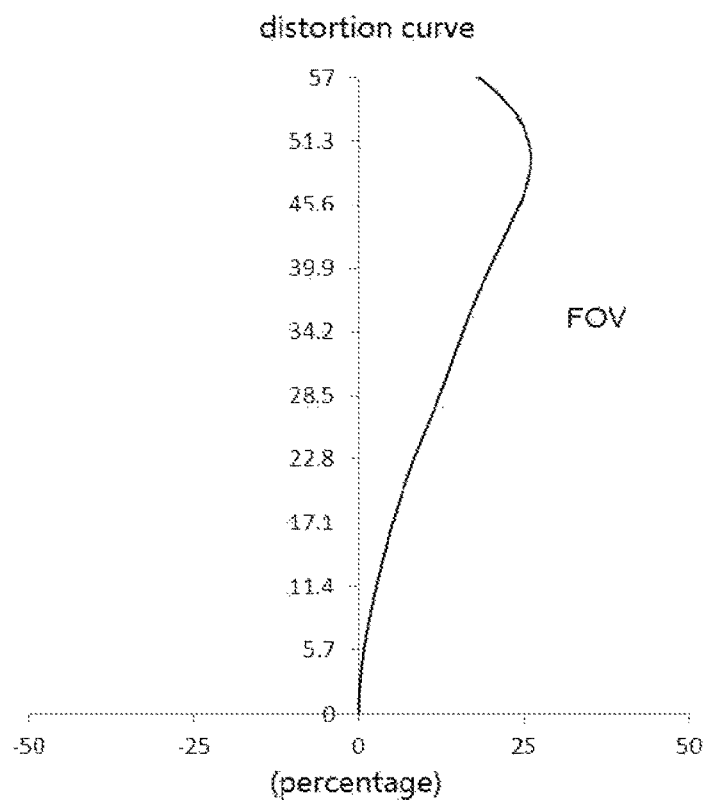
Figure 6D:
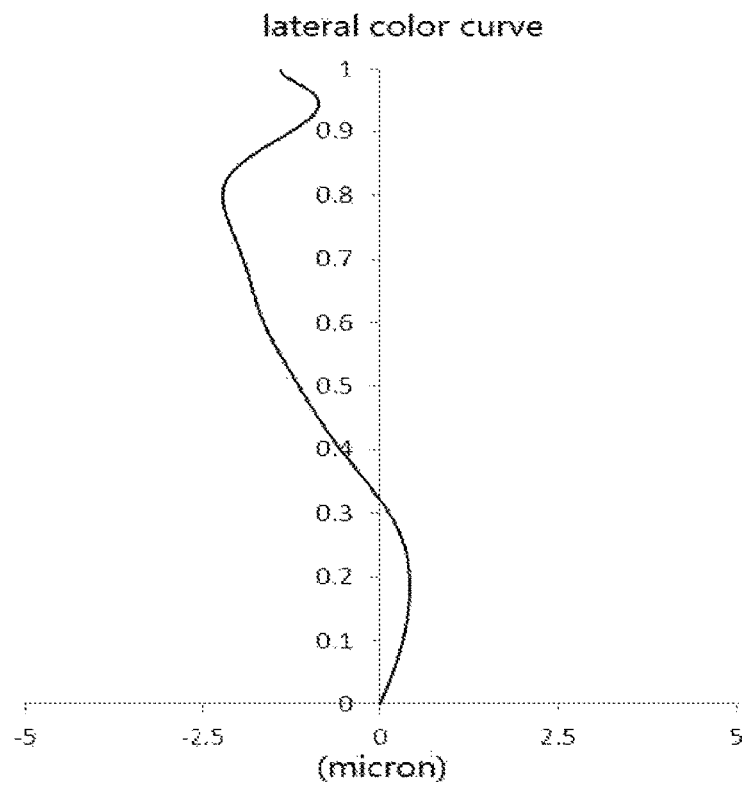

FIG. 6A illustrates a longitudinal aberration curve of the optical imaging lens according to embodiment 3 to represent deviation of a convergence focal point after light with different wavelengths passes through the lens. FIG. 6B illustrates an astigmatism curve of the optical imaging lens according to embodiment 3 to represent a meridian image surface curvature and a sagittal image surface curvature. FIG. 6C illustrates a distortion curve of the optical imaging lens according to embodiment 3 to represent distortion values corresponding to different FOVs. FIG. 6D illustrates a lateral color curve of the optical imaging lens according to embodiment 3 to represent deviation of different image heights on the imaging surface after the light passes through the lens. According to FIG. 6A to FIG. 6D, it can be seen that the optical imaging lens provided in embodiment 3 may achieve high imaging quality.

Embodiment 4

Figure 7:
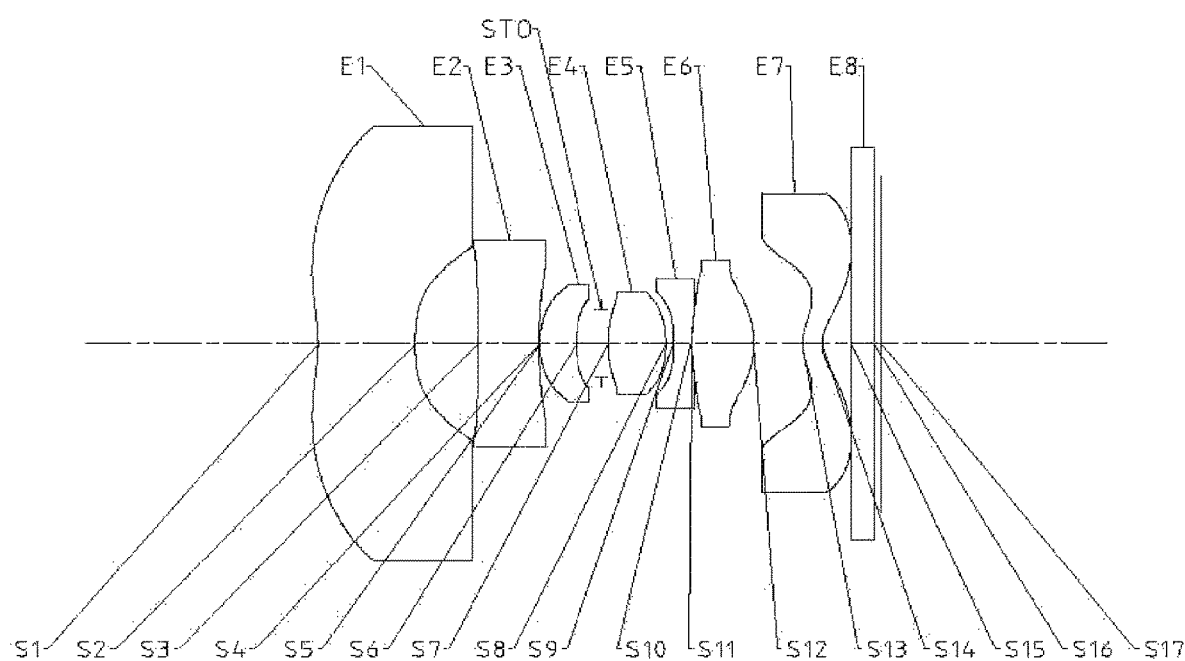
FIG. 7 shows a structure diagram of an optical imaging lens according to embodiment 4 of the disclosure.

The optical imaging lens according to embodiment 4 of the disclosure will be described below with reference to FIG. 7 to FIG. 8D. FIG. 7 is a structure diagram of the optical imaging lens according to embodiment 4 of the disclosure.

As shown in FIG. 7, an optical imaging lens sequentially includes from an object side to an image side along an optical axis: a first lens E1, a second lens E2, a third lens E3, a diaphragm STO, a fourth lens E4, a fifth lens E5, a sixth lens E6, a seventh lens E7 and an optical filter E8.

The first lens E1 has a negative focal power, an object-side surface S1 thereof is a concave surface, and an image-side surface S2 is a concave surface. The second lens E2 has a negative focal power, an object-side surface S3 thereof is a concave surface, and an image-side surface S4 is a concave surface. The third lens E3 has a positive focal power, an object-side surface S5 thereof is a convex surface, and an image-side surface S6 is a concave surface. The fourth lens E4 has a positive focal power, an object-side surface S7 thereof is a convex surface, and an image-side surface S8 is a convex surface. The fifth lens E5 has a negative focal power, an object-side surface S9 thereof is a convex surface, and an image-side surface S10 is a concave surface. The sixth lens E6 has a positive focal power, an object-side surface S11 thereof is a convex surface, and an image-side surface S12 is a convex surface. The seventh lens E7 has a negative focal power, an object-side surface S13 thereof is a convex surface, and an image-side surface S14 is a concave surface. The optical filter E8 has an object-side surface S15 and an image-side surface S16. The optical imaging lens is provided with an imaging surface S17. Light from an object sequentially penetrates through each of the surfaces S1 to S16 and is finally imaged on the imaging surface S17.

In the embodiment 4, the total effective focal length f of the optical imaging lens is 1.35 mm, the on-axis distance TTL from the object-side surface S1 of the first lens E1 to the imaging surface S17 is 7.27 mm, and ImgH is the half of the length of the diagonal line in the effective pixel region on the imaging surface S17, ImgH is 2.57 mm.

Table 7 shows basic parameters of the optical imaging lens of embodiment 4, in which the units of curvature radius, thickness/distance and focal length are millimeter (mm). Table 8 shows high-order coefficients applied to each aspherical mirror surface in embodiment 4. A surface type of each aspherical surface may be defined by formula (1) given in embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspherical | −2.9232 | 1.2473 | 1.54 | 55.7 | −3.16 | −28.7957 |
| S2 | Aspherical | 4.6300 | 0.8047 | | | | 7.8269 |
| S3 | Aspherical | −84.1367 | 0.7901 | 1.65 | 23.5 | −15.85 | 99.0000 |
| S4 | Aspherical | 11.6454 | 0.0100 | | | | 66.7728 |
| S5 | Aspherical | 1.5970 | 0.4768 | 1.65 | 23.5 | 5.65 | 1.5594 |
| S6 | Aspherical | 2.5161 | 0.3185 | | | | 3.4102 |
| STO | Spherical | Infinite | 0.0901 | | | | |
| S7 | Aspherical | 2.1462 | 0.7424 | 1.55 | 56.1 | 2.15 | −0.0424 |
| S8 | Aspherical | −2.2843 | 0.0954 | | | | 1.5081 |
| S9 | Aspherical | 80.0000 | 0.2300 | 1.67 | 20.4 | −2.23 | −99.0000 |
| S10 | Aspherical | 1.4589 | 0.0112 | | | | −18.3922 |
| S11 | Aspherical | 1.9993 | 0.7967 | 1.55 | 56.1 | 1.83 | −27.8123 |
| S12 | Aspherical | −1.7068 | 0.6246 | | | | 0.0424 |
| S13 | Aspherical | 0.8086 | 0.2533 | 1.54 | 55.7 | −8.90 | −3.9041 |
| S14 | Aspherical | 0.6159 | 0.3790 | | | | −2.5450 |
| S15 | Spherical | Infinite | 0.3000 | 1.52 | 64.2 | | |
| S16 | Spherical | Infinite | 0.1000 | | | | |
| S17 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 5.9829E−02 | −2.6410E−02 | 8.5710E−03 | −1.9400E−03 | 3.0500E−04 | −3.3000E−05 | 2.2900E−06 | −9.4000E−08 | 1.7100E−09 |
| S2 | 2.5563E−01 | −1.8247E−01 | 3.2524E−02 | 1.1931E−01 | −1.7442E−01 | 1.4246E−01 | −7.5470E−02 | 2.2759E−02 | −2.8800E−03 |
| S3 | 3.8009E−02 | −2.0700E−01 | 5.4698E−01 | −8.2943E−01 | 7.5785E−01 | −4.2911E−01 | 1.4842E−01 | −2.8910E−02 | 2.4400E−03 |
| S4 | −1.3239E−01 | 1.1502E+00 | −3.5767E+00 | 5.6653E+00 | −4.3223E+00 | 3.8530E−01 | 1.8282E+00 | −1.2553E+00 | 2.7047E−01 |
| S5 | −1.1963E−01 | 1.3243E+00 | −4.5046E+00 | 1.0371E+01 | −2.4037E+01 | 5.2994E+01 | −7.7676E+01 | 6.1364E+01 | −1.9917E+01 |
| S6 | 1.5181E−01 | −3.1505E−01 | 7.7217E+00 | −6.1632E+01 | 2.8941E+02 | −8.0211E+02 | 1.2991E+03 | −1.1140E+03 | 3.7508E+02 |
| S7 | 5.7353E−02 | −4.9529E−01 | 6.1017E+00 | −4.3609E+01 | 1.9085E+02 | −5.1986E+02 | 8.5833E+02 | −7.8356E+02 | 3.0215E+02 |
| S8 | −6.0762E−01 | 1.3874E+00 | 2.2547E−01 | −2.1436E+01 | 8.7572E+00 | −1.8103E+02 | 2.1569E+02 | −1.3929E+02 | 3.7135E+01 |
| S9 | −1.2014E+00 | 2.6260E+00 | −2.9264E+00 | −1.1045E+01 | 5.5244E+01 | −1.3062E+02 | 1.9801E+02 | −1.7102E+02 | 6.1504E+01 |
| S10 | −6.2831E−01 | 1.7888E+00 | −3.2098E+00 | 1.9431E+00 | 4.2995E+00 | −1.1335E+01 | 1.2068E+01 | −6.5030E+00 | 1.4557E+00 |
| S11 | −4.1995E−01 | 1.7000E+00 | −4.7396E+00 | 8.7902E+00 | −1.0256E+01 | 7.3405E+00 | −2.9850E+00 | 5.4104E−01 | −7.2400E−03 |
| S12 | −1.3730E−01 | 6.1448E−01 | −1.3820E+00 | 2.3111E+00 | −2.9002E+00 | 2.6581E+00 | −1.5371E+00 | 4.7847E−01 | −6.0360E−02 |
| S13 | −4.5045E−01 | 1.1577E−01 | −1.7844E−01 | 7.5218E−01 | −1.1484E+00 | 8.5353E−01 | −3.3788E−01 | 6.8989E−02 | −5.7500E−03 |
| S14 | −3.7605E−01 | 3.3266E−01 | −1.9833E−01 | 8.6629E−02 | −2.9330E−02 | 7.5410E−03 | −1.3400E−03 | 1.4000E−04 | −6.4000E−06 |

Figure 8A:
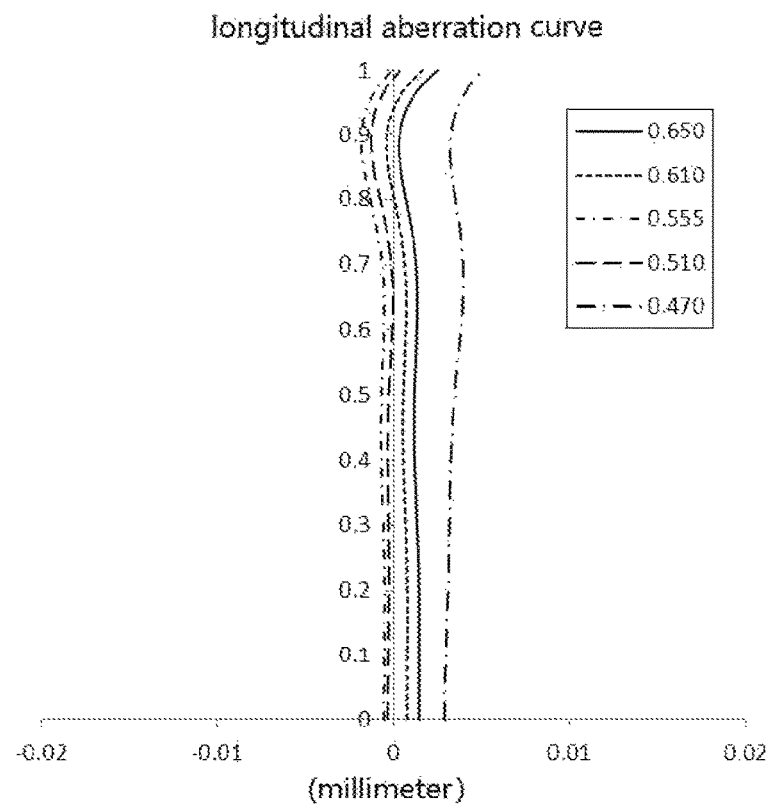
FIG. 8A to FIG. 8D show a longitudinal aberration curve, an astigmatism curve, a distortion curve and a lateral color curve of an optical imaging lens according to embodiment 4 respectively.
Figure 8B:
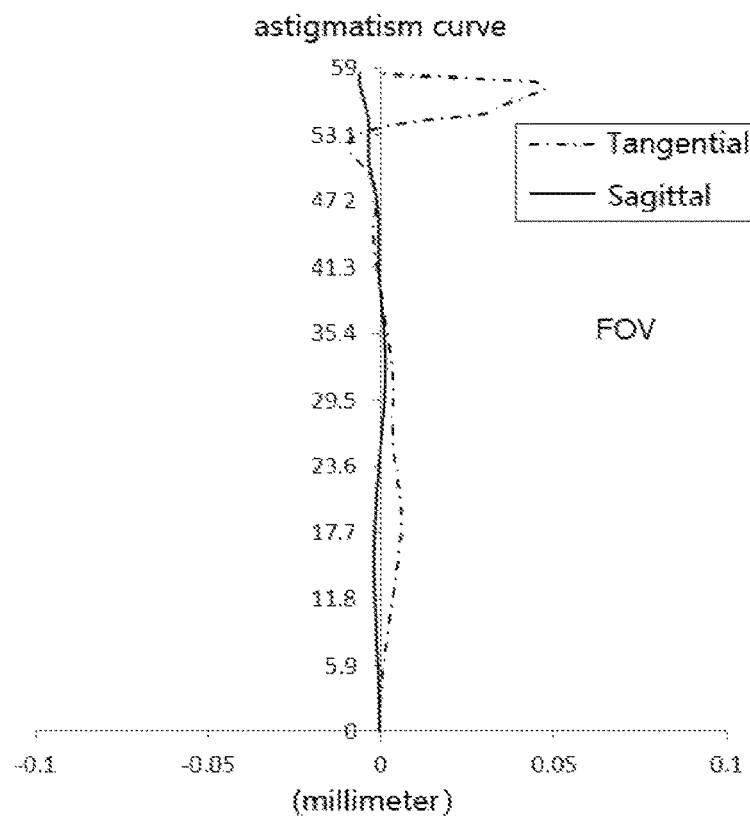
Figure 8C:
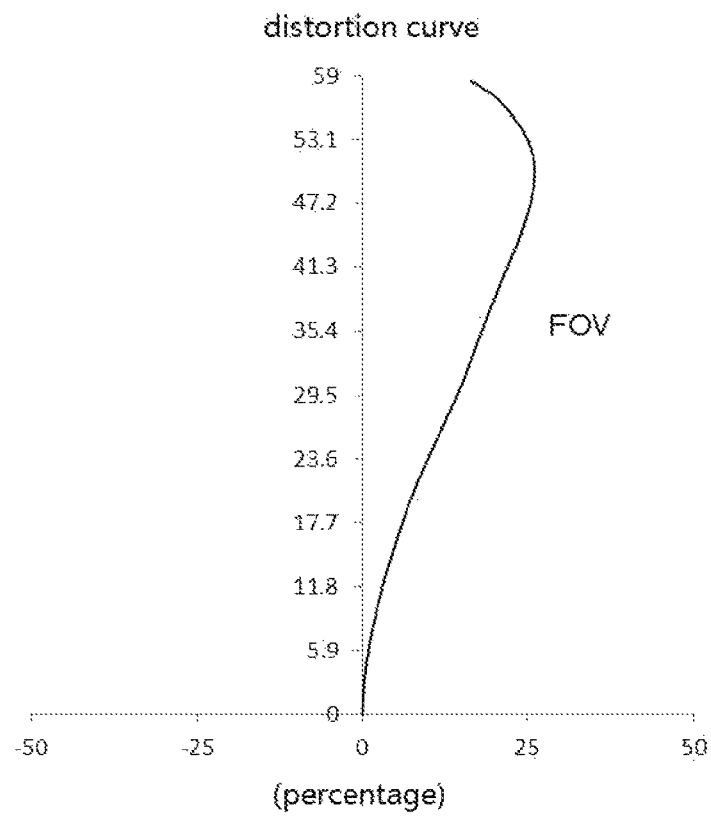
Figure 8D:
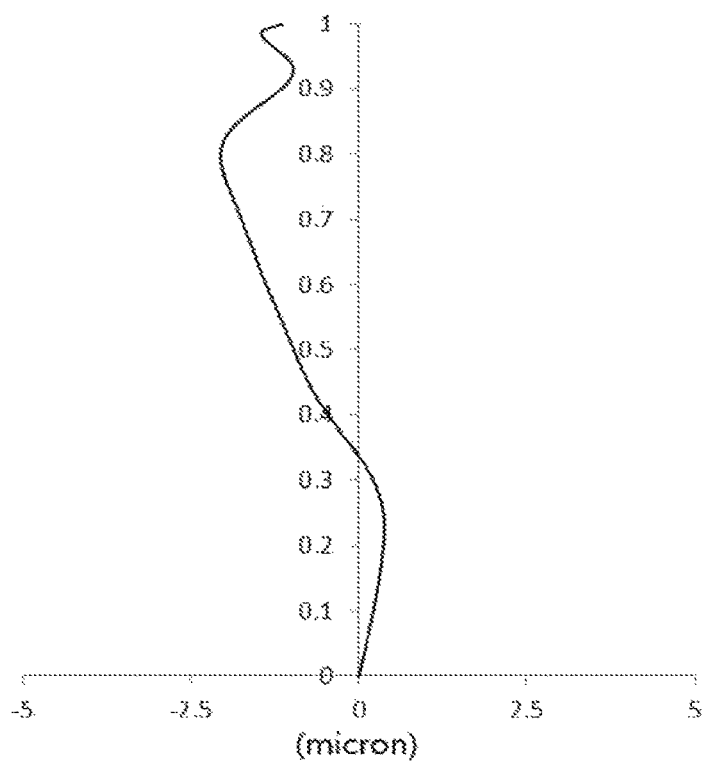

FIG. 8A illustrates a longitudinal aberration curve of the optical imaging lens according to embodiment 4 to represent deviation of a convergence focal point after light with different wavelengths passes through the lens. FIG. 8B illustrates an astigmatism curve of the optical imaging lens according to embodiment 4 to represent a meridian image surface curvature and a sagittal image surface curvature. FIG. 8C illustrates a distortion curve of the optical imaging lens according to embodiment 4 to represent distortion values corresponding to different FOVs. FIG. 8D illustrates a lateral color curve of the optical imaging lens according to embodiment 4 to represent deviation of different image heights on the imaging surface after the light passes through the lens. According to FIG. 8A to FIG. 8D, it can be seen that the optical imaging lens provided in embodiment 4 may achieve high imaging quality.

Embodiment 5

Figure 9:
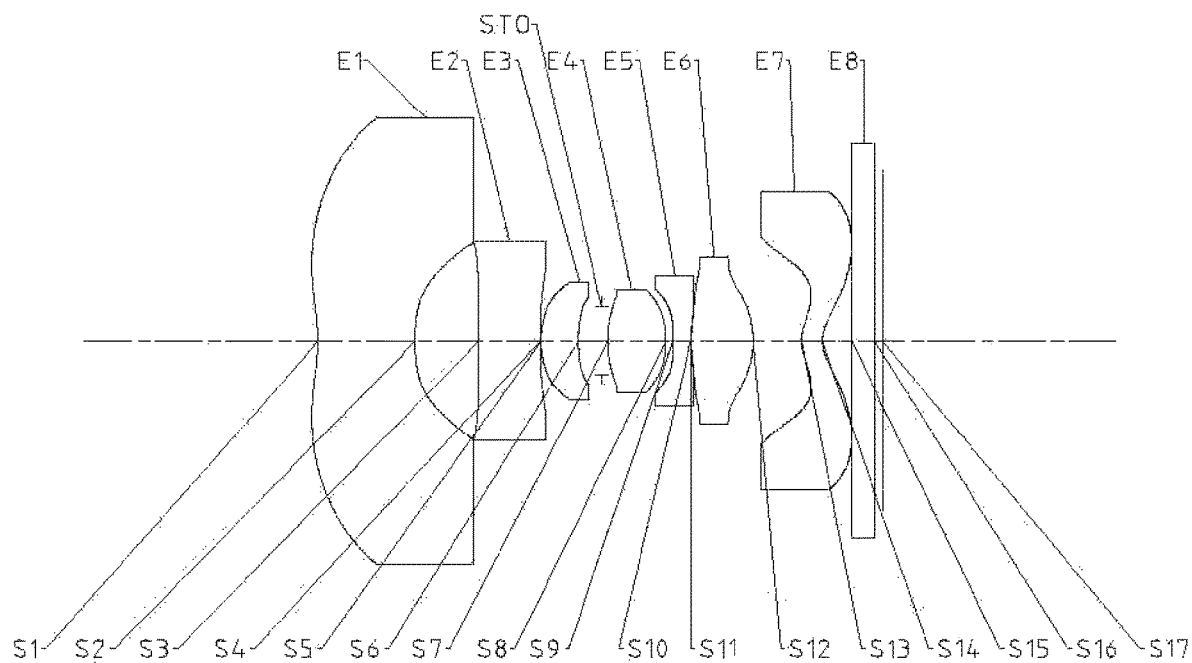
FIG. 9 shows a structure diagram of an optical imaging lens according to embodiment 5 of the disclosure.

The optical imaging lens according to embodiment 5 of the disclosure will be described below with reference to FIG. 9 to FIG. 10D. FIG. 9 is a structure diagram of the optical imaging lens according to embodiment 5 of the disclosure.

As shown in FIG. 9, an optical imaging lens sequentially includes from an object side to an image side along an optical axis: a first lens E1, a second lens E2, a third lens E3, a diaphragm STO, a fourth lens E4, a fifth lens E5, a sixth lens E6, a seventh lens E7 and an optical filter E8.

The first lens E1 has a negative focal power, an object-side surface S1 thereof is a concave surface, and an image-side surface S2 is a concave surface. The second lens E2 has a negative focal power, an object-side surface S3 thereof is a concave surface, and an image-side surface S4 is a concave surface. The third lens E3 has a positive focal power, an object-side surface S5 thereof is a convex surface, and an image-side surface S6 is a concave surface. The fourth lens E4 has a positive focal power, an object-side surface S7 thereof is a convex surface, and an image-side surface S8 is a convex surface. The fifth lens E5 has a negative focal power, an object-side surface S9 thereof is a concave surface, and an image-side surface S10 is a concave surface. The sixth lens E6 has a positive focal power, an object-side surface S11 thereof is a convex surface, and an image-side surface S12 is a convex surface. The seventh lens E7 has a negative focal power, an object-side surface S13 thereof is a convex surface, and an image-side surface S14 is a concave surface. The optical filter E8 has an object-side surface S15 and an image-side surface S16. The optical imaging lens is provided with an imaging surface S17. Light from an object sequentially penetrates through each of the surfaces S1 to S16 and is finally imaged on the imaging surface S17.

In the embodiment 5, the total effective focal length f of the optical imaging lens is 1.35 mm, the on-axis distance TTL from the object-side surface S1 of the first lens E1 to the imaging surface S17 is 7.23 mm, and ImgH is the half of the length of the diagonal line in the effective pixel region on the imaging surface S17, ImgH is 2.57 mm.

Table shows basic parameters of the optical imaging lens of embodiment 5, in which the units of curvature radius, thickness/distance and focal length are millimeter (mm). Table 10 shows high-order coefficients applied to each a spherical mirror surface in embodiment 5. A surface type of each a spherical surface may be defined by formula (1) given in embodiment 1.

TABLE 9

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Aspherical | −2.9212 | 1.2407 | 1.54 | 55.7 | −3.16 | −28.4156 |
| S2 | Aspherical | 4.6339 | 0.8118 | | | | 7.8031 |
| S3 | Aspherical | −52.3090 | 0.7832 | 1.65 | 23.5 | −15.15 | 99.0000 |
| S4 | Aspherical | 12.0549 | 0.0100 | | | | 66.1075 |
| S5 | Aspherical | 1.6012 | 0.4777 | 1.65 | 23.5 | 5.51 | 1.5575 |
| S6 | Aspherical | 2.5788 | 0.3085 | | | | 3.2977 |
| STO | Spherical | Infinite | 0.0791 | | | | |
| S7 | Aspherical | 2.1739 | 0.7428 | 1.55 | 56.1 | 2.10 | −0.0492 |
| S8 | Aspherical | −2.1312 | 0.0903 | | | | 1.4436 |
| S9 | Aspherical | −38.0054 | 0.2300 | 1.67 | 20.4 | −2.23 | −99.0000 |
| S10 | Aspherical | 1.5469 | 0.0112 | | | | −18.8325 |
| S11 | Aspherical | 2.1625 | 0.7861 | 1.55 | 56.1 | 1.87 | −30.9287 |
| S12 | Aspherical | −1.6798 | 0.6220 | | | | 0.0637 |
| S13 | Aspherical | 0.8171 | 0.2592 | 1.54 | 55.7 | −8.45 | −3.9576 |
| S14 | Aspherical | 0.6156 | 0.3824 | | | | −2.5360 |
| S15 | Spherical | Infinite | 0.3000 | 1.52 | 64.2 | | |
| S16 | Spherical | Infinite | 0.1000 | | | | |
| S17 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 5.7094E−02 | −2.4460E−02 | 7.6970E−03 | −1.6900E−03 | 2.5700E−04 | −2.7000E−05 | 1.8100E−06 | −7.2000E−08 | 1.2600E−09 |
| S2 | 2.4836E−01 | −1.7763E−01 | 4.0114E−02 | 1.0143E−01 | −1.6026E−01 | 1.3716E−01 | −7.4140E−02 | 2.2322E−02 | −2.8000E−03 |
| S3 | 3.7215E−02 | −2.0059E−01 | 5.2780E−01 | −7.9889E−01 | 7.2817E−01 | −4.1109E−01 | 1.4168E−01 | −2.7480E−02 | 2.3110E−03 |
| S4 | −1.1127E−01 | 9.7322E−01 | −2.8252E+00 | 3.7261E+00 | −1.1403E+00 | −2.9441E+00 | 3.9723E+00 | −2.0281E+00 | 3.8970E−01 |

TABLE 10-continued

| Surface number | A4 | A6 | A8 | A10 | A12 | A14 | A16 | A18 | A20 |
|---|---|---|---|---|---|---|---|---|---|
| S5 | −1.0595E−01 | 1.2088E+00 | −4.3818E+00 | 1.2159E+01 | −3.3835E+01 | 7.6889E+00 | −1.0925E+02 | 8.3251E+01 | −2.6145E+01 |
| S6 | 1.4585E−01 | −1.0418E−01 | 4.0591E+00 | −2.4508E+01 | 6.2065E+01 | 5.4461E+01 | −6.3720E+02 | 1.2921E+03 | −8.8575E+02 |
| S7 | 5.5862E−02 | −4.7366E−01 | 5.9830E+00 | −4.2996E+01 | 1.8768E+02 | −5.0862E+02 | 8.3500E+02 | −7.5826E+02 | 2.9111E+02 |
| S8 | −6.0433E−01 | 1.3413E+00 | 9.6727E−01 | −2.5948E+01 | 1.0372E+02 | −2.1944E+02 | 2.7413E+02 | −1.8933E+02 | 5.5127E+01 |
| S9 | −1.1925E+00 | 2.4944E+00 | −1.5798E+00 | −1.9180E+01 | 8.6820E+01 | −2.1136E+02 | 3.2548E+02 | −2.8115E+02 | 1.0092E+02 |
| S10 | −5.9862E−01 | 1.2504E+00 | −3.7784E−01 | −5.5137E+00 | 1.5449E+01 | −2.1006E+01 | 1.6608E+01 | −7.3783E+00 | 1.4405E+00 |
| S11 | −3.4063E−01 | 7.6225E−01 | −2.8050E−02 | −4.2545E+00 | 1.1658E+01 | −1.5705E+01 | 1.1910E+01 | −4.8865E+00 | 8.4771E−01 |
| S12 | −1.4172E−01 | 6.1695E−01 | −1.3911E+00 | 2.3642E+00 | −3.0285E+00 | 2.8191E+00 | −1.6444E+00 | 5.1421E−01 | −6.5040E−02 |
| S13 | −4.5416E−01 | 1.1751E−01 | −1.9514E−01 | 7.9406E−01 | −1.2011E+00 | 8.9110E−01 | −3.5275E−01 | 7.2009E−02 | −6.0000E−03 |
| S14 | −3.7969E−01 | 3.3995E−01 | −2.0402E−01 | 8.8650E−02 | −2.9380E−02 | 7.3350E−03 | −1.2700E−03 | 1.3100E−04 | −6.0000E−06 |

Figure 10A:
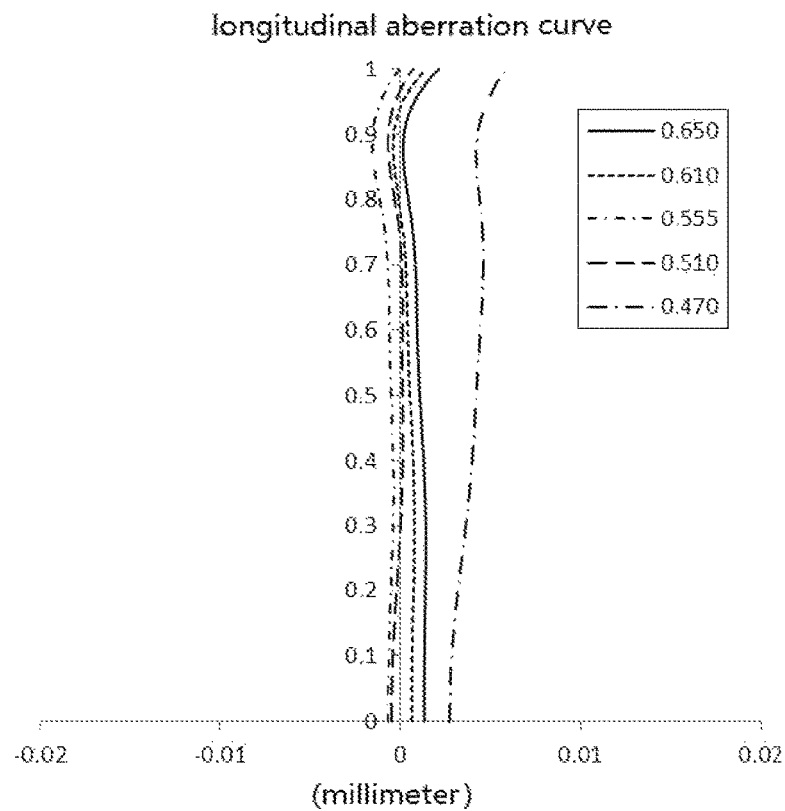
FIG. 10A to FIG. 10D show a longitudinal aberration curve, an astigmatism curve, a distortion curve and a lateral color curve of an optical imaging lens according to embodiment 5 respectively.
Figure 10B:
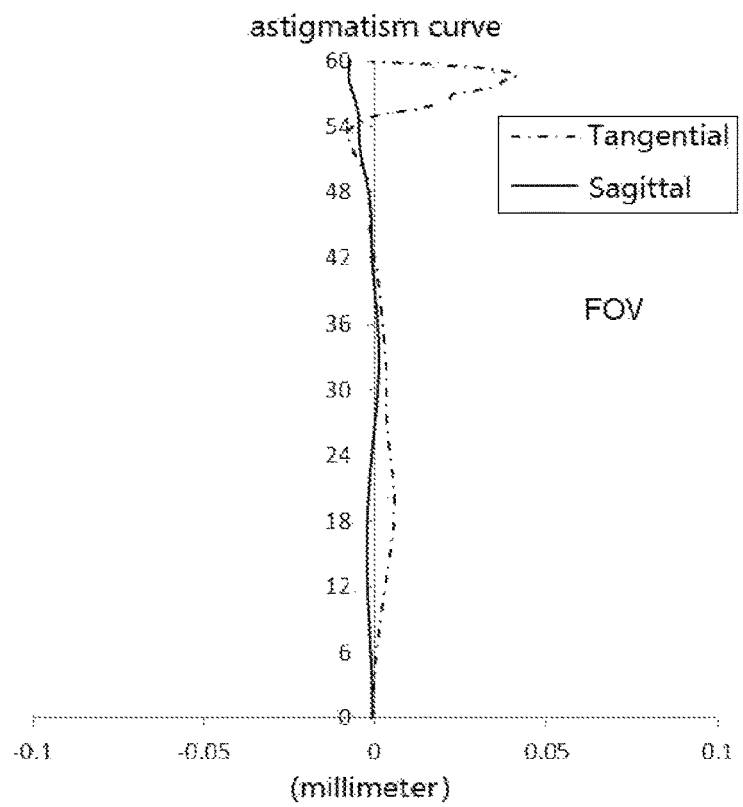
Figure 10C:
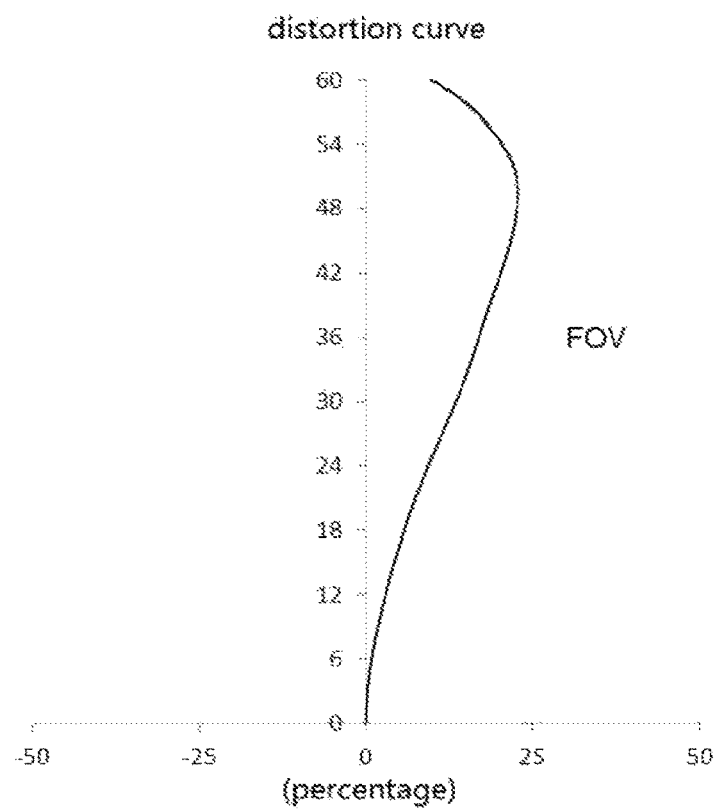
Figure 10D:
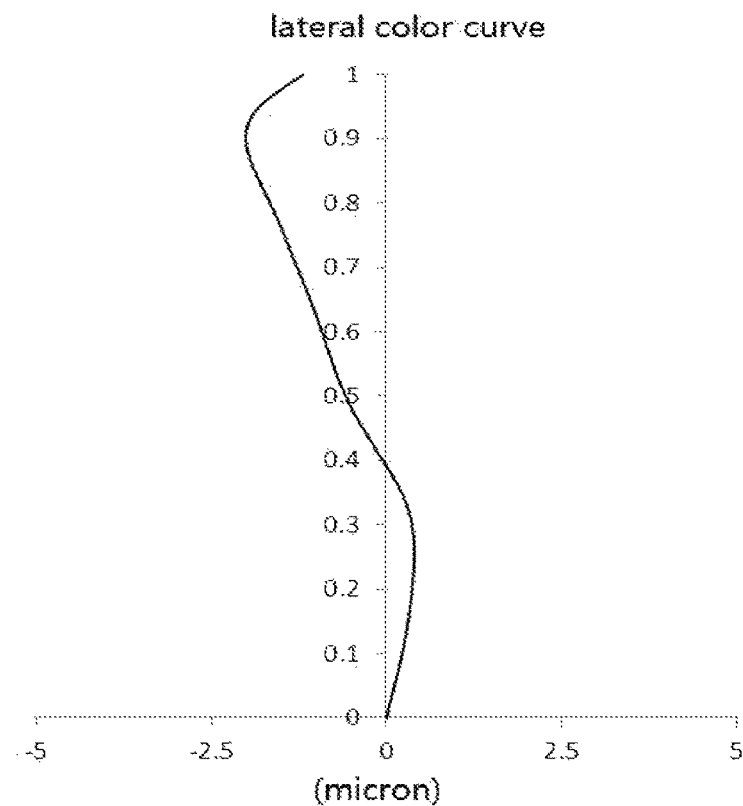

FIG. 10A illustrates a longitudinal aberration curve of the optical imaging lens according to embodiment 5 to represent deviation of a convergence focal point after light with different wavelengths passes through the lens. FIG. 10B illustrates an astigmatism curve of the optical imaging lens according to embodiment 5 to represent a meridian image surface curvature and a sagittal image surface curvature. FIG. 10C illustrates a distortion curve of the optical imaging lens according to embodiment 5 to represent distortion values corresponding to different FOVs. FIG. 10D illustrates a lateral color curve of the optical imaging lens according to embodiment 5 to represent deviation of different image heights on the imaging surface after the light passes through the lens. According to FIG. 10A to FIG. 10D, it can be seen that the optical imaging lens provided in embodiment 5 may achieve high imaging quality.

Embodiment 6

Figure 11:
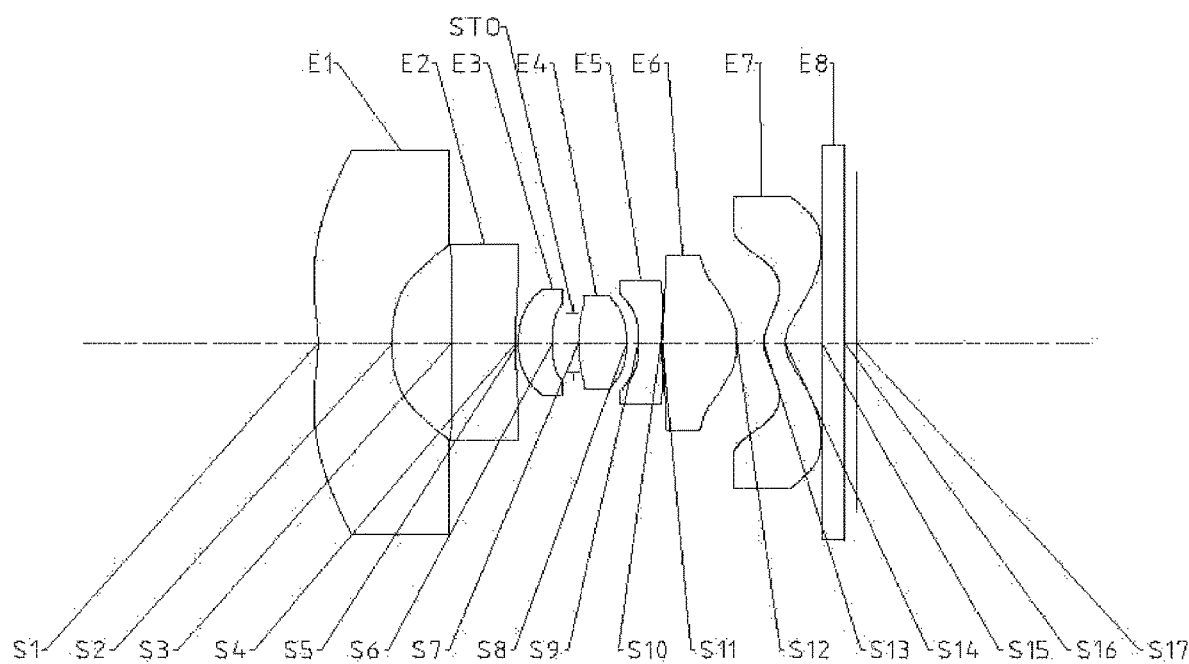
FIG. 11 shows a structure diagram of an optical imaging lens according to embodiment 6 of the disclosure.

The optical imaging lens according to embodiment 6 of the disclosure will be described below with reference to FIG. 11 to FIG. 12D. FIG. 11 is a structure diagram of the optical imaging lens according to embodiment 6 of the disclosure.

As shown in FIG. 11, an optical imaging lens sequentially includes from an object side to an image side along an optical axis: a first lens E1, a second lens E2, a third lens E3, a diaphragm STO, a fourth lens E4, a fifth lens E5, a sixth lens E6, a seventh lens E7 and an optical filter E8.

The first lens E1 has a negative focal power, an object-side surface S1 thereof is a concave surface, and an image-side surface S2 is a concave surface. The second lens E2 has a negative focal power, an object-side surface S3 thereof is a concave surface, and an image-side surface S4 is a concave surface. The third lens E3 has a positive focal power, an object-side surface S5 thereof is a convex surface, and an image-side surface S6 is a concave surface. The fourth lens E4 has a positive focal power, an object-side surface S7 thereof is a convex surface, and an image-side surface S8 is a convex surface. The fifth lens E5 has a negative focal power, an object-side surface S9 thereof is a concave surface, and an image-side surface S10 is a concave surface. The sixth lens E6 has a positive focal power, an object-side surface S11 thereof is a convex surface, and an image-side surface S12 is a convex surface. The seventh lens E7 has a positive focal power, an object-side surface S13 thereof is a convex surface, and an image-side surface S14 is a concave surface. The optical filter E8 has an object-side surface S15 and an image-side surface S16. The optical imaging lens is provided with an imaging surface S17. Light from an object sequentially penetrates through each of the surfaces S1 to S16 and is finally imaged on the imaging surface S17.

In the embodiment 6, the total effective focal length f of the optical imaging lens is 1.25 mm, the on-axis distance TTL from the object-side surface S1 of the first lens E1 to the imaging surface S17 is 6.90 mm, and ImgH is the half of the length of the diagonal line in the effective pixel region on the imaging surface S17, ImgH is 2.57 mm.

Table 11 shows basic parameters of the optical imaging lens of embodiment 6, in which the units of curvature radius, thickness/distance and focal length are millimeter (mm). Table 12 shows high-order coefficients applied to each aspherical mirror surface in embodiment 6. A surface type of each aspherical surface may be defined by formula (1) given in embodiment 1.

TABLE 11

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Aspherical | −2.9136 | 0.9485 | 1.54 | 55.7 | −3.17 | −36.0860 |
| S2 | Aspherical | 4.5697 | 0.7576 | | | | 7.7619 |
| S3 | Aspherical | −92.4415 | 0.8224 | 1.65 | 23.5 | −23.23 | −99.0000 |
| S4 | Aspherical | 17.8959 | 0.0332 | | | | 69.2422 |
| S5 | Aspherical | 1.5178 | 0.4326 | 1.65 | 23.5 | 6.35 | 1.5470 |
| S6 | Aspherical | 2.1450 | 0.2675 | | | | 5.5829 |
| STO | Spherical | Infinite | 0.0689 | | | | 0.0000 |
| S7 | Aspherical | 2.2926 | 0.6282 | 1.55 | 56.1 | 1.87 | −0.6742 |
| S8 | Aspherical | −1.6662 | 0.1488 | | | | 1.1157 |
| S9 | Aspherical | −4.0012 | 0.2894 | 1.67 | 20.4 | −1.95 | 10.5535 |
| S10 | Aspherical | 1.9789 | 0.0147 | | | | −30.5038 |
| S11 | Aspherical | 3.2546 | 0.9574 | 1.55 | 56.1 | 1.95 | −37.2562 |
| S12 | Aspherical | −1.4137 | 0.3441 | | | | −0.1694 |
| S13 | Aspherical | 0.6600 | 0.2733 | 1.54 | 55.7 | 28.52 | −3.2504 |
| S14 | Aspherical | 0.5900 | 0.4651 | | | | −2.1125 |

TABLE 11-continued

| Surface number | Surface type | Curvature radius | Thickness/ distance | Material Refractive index | Abbe number | Focal length | Conic coefficient |
|---|---|---|---|---|---|---|---|
| 515 | Spherical | Infinite | 0.3000 | 1.52 | 64.2 | | |
| 516 | Spherical | Infinite | 0.1500 | | | | |
| S17 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 8.5312E−02 | −4.9100E−02 | 2.0228E−02 | −5.7600E−03 | 1.1280E−03 | −1.5000E−04 | 1.3000E−05 | −6.6000E−07 | 1.5000E−08 |
| S2 | 2.7578E−01 | −2.1070E−01 | 1.6435E−02 | 1.8717E−01 | −2.2226E−01 | 1.4413E−01 | −6.5680E−02 | 1.9300E−02 | −2.5600E−03 |
| S3 | 2.0240E−02 | −1.1845E−01 | 3.9856E−01 | −6.9424E−01 | 6.9175E−01 | −4.1649E−01 | 1.5102E−01 | −3.0520E−02 | 2.6470E−03 |
| S4 | −1.0885E−01 | 1.0179E+00 | −4.0150E+00 | 8.9500E+00 | −1.2171E+01 | 1.0352E+01 | −5.4218E+00 | 1.6134E+00 | −2.1088E−01 |
| S5 | −6.4030E−02 | 1.1177E+00 | −4.8111E+00 | 1.3095E+01 | −2.9564E+01 | 6.3637E+01 | −1.0070E+02 | 8.9222E+01 | −3.2675E+01 |
| S6 | 1.8908E−01 | −1.2627E−01 | 6.4582E+00 | −6.0502E+01 | 3.2091E+02 | −8.8187E+02 | 1.0660E+03 | 6.2159E+00 | −7.5826E+02 |
| S7 | 8.7386E−02 | −8.3982E−01 | 1.2339E+00 | −1.1149E+02 | 6.1581E+02 | −2.1206E+03 | 4.4304E+03 | −5.1319E+03 | 2.5233E+03 |
| S8 | −3.7466E−01 | 5.4868E−01 | 1.9063E+00 | −2.5408E+01 | 1.0529E+02 | −2.5235E+02 | 3.8413E+02 | −3.4161E+02 | 1.3200E+02 |
| S9 | −1.0022E+00 | 1.7534E+00 | −5.0664E−01 | −1.9028E+01 | 9.7679E+01 | −3.0491E+02 | 6.0311E+02 | −6.4049E+02 | 2.7315E+02 |
| S10 | −3.9114E−01 | −3.5010E−01 | 5.9356E+00 | −2.1670E+01 | 4.2501E+01 | −4.9046E+01 | 3.3006E+01 | −1.1770E+01 | 1.6712E+00 |
| S11 | −1.7548E−01 | −5.9553E−01 | 5.9907E+00 | −2.1524E+01 | 4.3749E+00 | −5.3723E+01 | 3.9512E+01 | −1.6059E+01 | 2.7732E+00 |
| S12 | −4.6923E−01 | 1.9156E+00 | −4.4097E+00 | 7.3418E+00 | −8.5638E+00 | 6.6866E+00 | −3.2440E+00 | 8.7093E−01 | −9.8280E−02 |
| S13 | −3.2941E−01 | 6.4088E−02 | −1.6036E−01 | 5.4328E−01 | −7.1295E−01 | 4.5909E−01 | −1.5587E−01 | 2.6903E−02 | −1.8700E−03 |
| S14 | −2.9064E−01 | 1.4021E−01 | −1.1500E−03 | −3.3630E−02 | 1.5790E−02 | −2.7500E−03 | 1.0000E−05 | 5.1900E−05 | −4.4000E−06 |

Figure 12A:
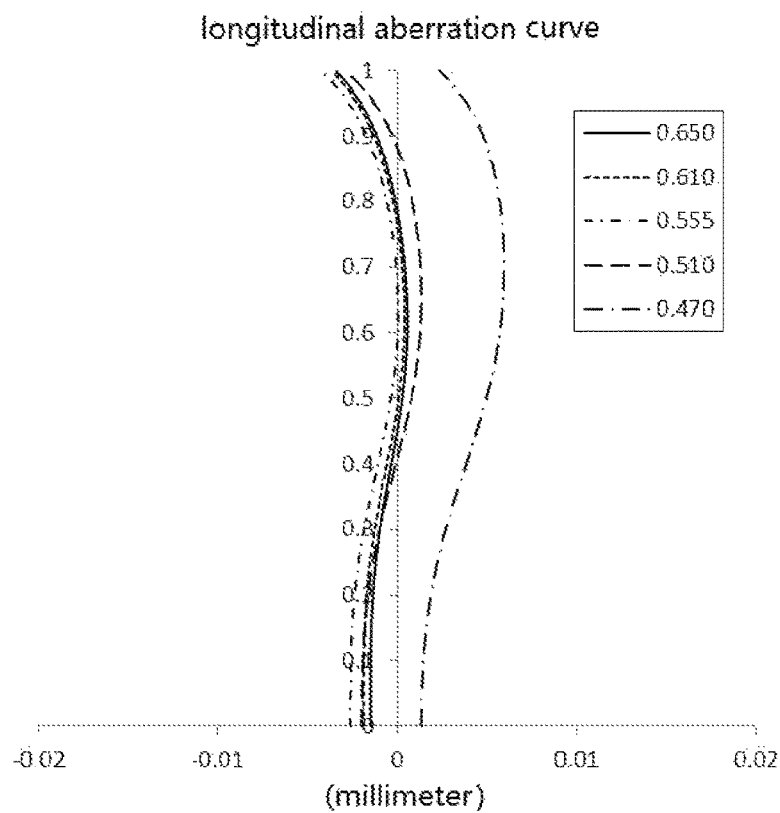
FIG. 12A to FIG. 12D show a longitudinal aberration curve, an astigmatism curve, a distortion curve and a lateral color curve of an optical imaging lens according to embodiment 6 respectively.
Figure 12B:
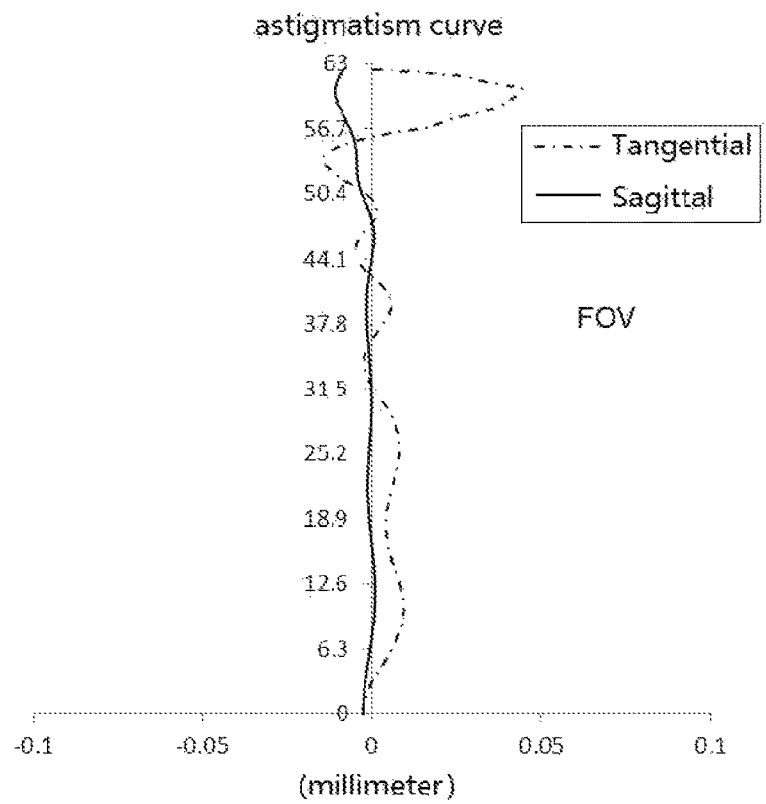
Figure 12C:
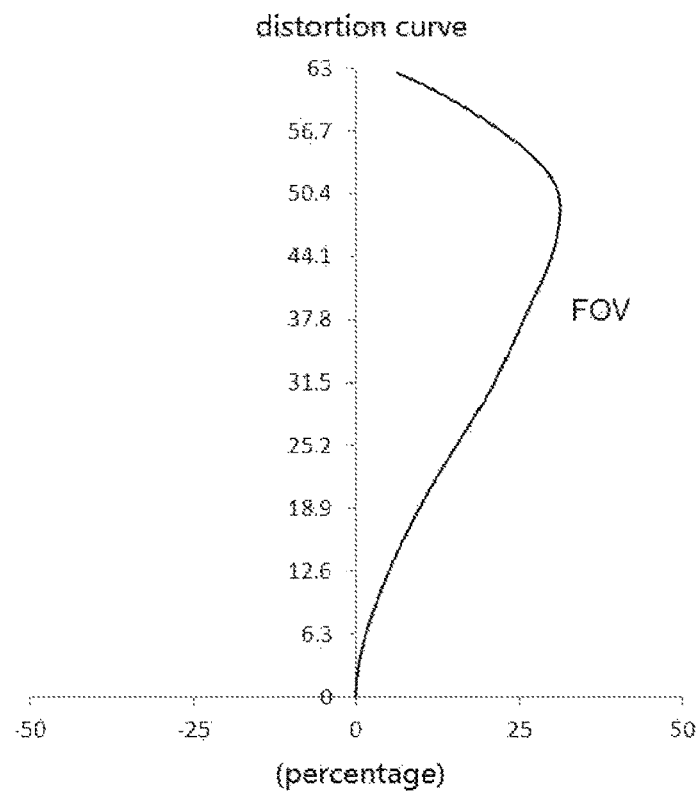
Figure 12D:
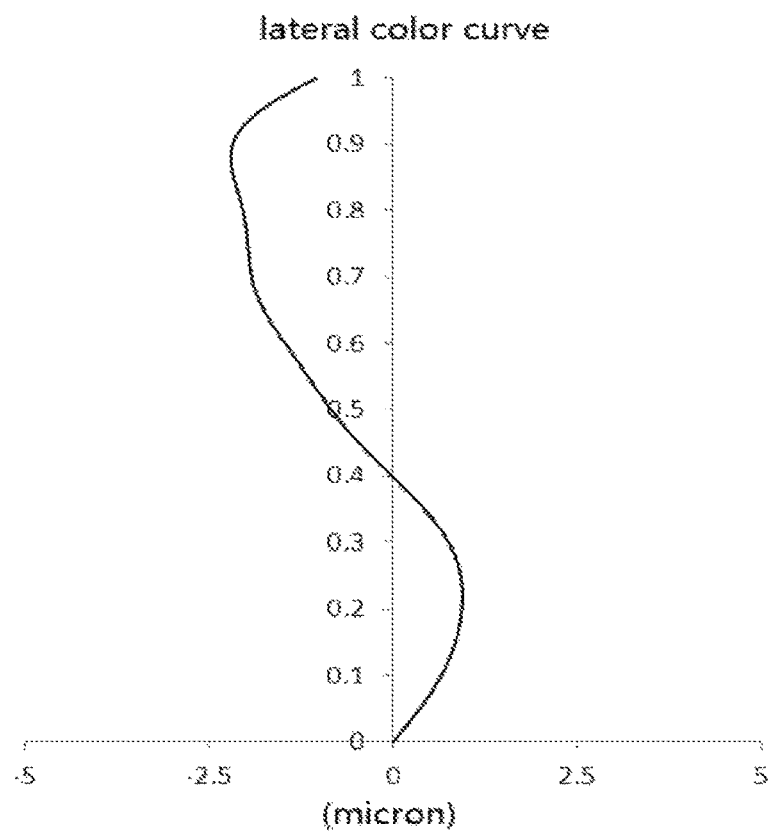

FIG. 12A illustrates a longitudinal aberration curve of the optical imaging lens according to embodiment 6 to represent deviation of a convergence focal point after light with different wavelengths passes through the lens. FIG. 12B illustrates an astigmatism curve of the optical imaging lens according to embodiment 6 to represent a meridian image surface curvature and a sagittal image surface curvature. FIG. 12C illustrates a distortion curve of the optical imaging lens according to embodiment 6 to represent distortion values corresponding to different FOVs. FIG. 12D illustrates a lateral color curve of the optical imaging lens according to embodiment 6 to represent deviation of different image heights on the imaging surface after the light passes through the lens. According to FIG. 12A to FIG. 12D, it can be seen that the optical imaging lens provided in embodiment 6 may achieve high imaging quality.

Embodiment 7

Figure 13:
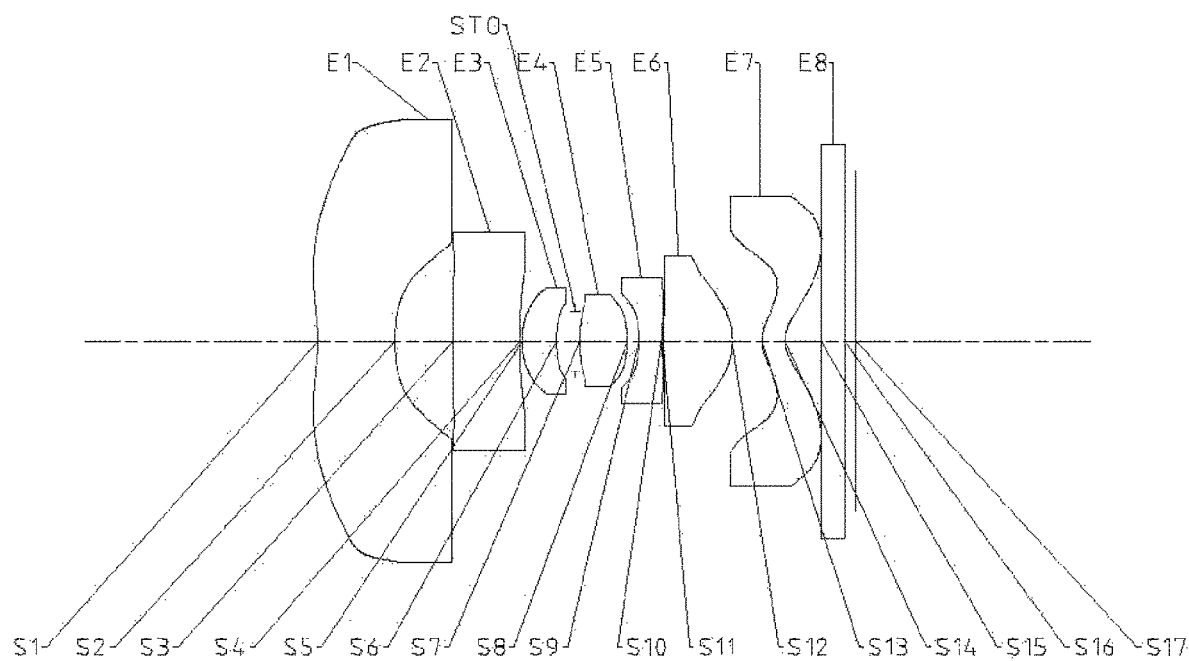
FIG. 13 shows a structure diagram of an optical imaging lens according to embodiment 7 of the disclosure.

The optical imaging lens according to embodiment 7 of the disclosure will be described below with reference to FIG. 13 to FIG. 14D. FIG. 13 is a structure diagram of the optical imaging lens according to embodiment 7 of the disclosure.

As shown in FIG. 13, an optical imaging lens sequentially includes from an object side to an image side along an optical axis: a first lens E1, a second lens E2, a third lens E3, a diaphragm STO, a fourth lens E4, a fifth lens E5, a sixth lens E6, a seventh lens E7 and an optical filter E8.

The first lens E1 has a negative focal power, an object-side surface S1 thereof is a concave surface, and an image-side surface S2 is a concave surface. The second lens E2 has a negative focal power, an object-side surface S3 thereof is a convex surface, and an image-side surface S4 is a concave surface. The third lens E3 has a positive focal power, an object-side surface S5 thereof is a convex surface, and an image-side surface S6 is a concave surface. The fourth lens E4 has a positive focal power, an object-side surface S7 thereof is a convex surface, and an image-side surface S8 is a convex surface. The fifth lens E5 has a negative focal power, an object-side surface S9 thereof is a concave surface, and an image-side surface S10 is a concave surface. The sixth lens E6 has a positive focal power, an object-side surface S11 thereof is a convex surface, and an image-side surface S12 is a convex surface. The seventh lens E7 has a positive focal power, an object-side surface S13 thereof is a convex surface, and an image-side surface S14 is a concave surface. The optical filter E8 has an object-side surface S15 and an image-side surface S16. The optical imaging lens is provided with an imaging surface S17. Light from an object sequentially penetrates through each of the surfaces S1 to S16 and is finally imaged on the imaging surface S17.

In the embodiment 7, the total effective focal length f of the optical imaging lens is 1.29 mm, the on-axis distance TTL from the object-side surface S1 of the first lens E1 to the imaging surface S17 is 6.92 mm, and ImgH is the half of the length of the diagonal line in the effective pixel region on the imaging surface S17, ImgH is 2.57 mm.

Table 13 shows basic parameters of the optical imaging lens of embodiment 7, in which the units of curvature radius, thickness/distance and focal length are millimeter (mm). Table 14 shows high-order coefficients applied to each aspherical mirror surface in embodiment 7. A surface type of each a spherical surface may be defined by formula (1) given in embodiment 1.

TABLE 13

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspherical | −2.9050 | 0.9869 | 1.54 | 55.7 | −3.17 | −32.6466 |
| S2 | Aspherical | 4.5912 | 0.7462 | | | | 7.6507 |
| S3 | Aspherical | 80.0000 | 0.8604 | 1.65 | 23.5 | −22.13 | −99.0000 |
| S4 | Aspherical | 12.0396 | 0.0280 | | | | 70.7242 |
| S5 | Aspherical | 1.4989 | 0.4385 | 1.65 | 23.5 | 5.87 | 1.4990 |
| S6 | Aspherical | 2.2001 | 0.2448 | | | | 5.5702 |
| STO | Spherical | Infinite | 0.0555 | | | | |
| S7 | Aspherical | 2.3401 | 0.6206 | 1.55 | 56.1 | 1.88 | −0.5472 |
| S8 | Aspherical | −1.6644 | 0.1459 | | | | 1.1963 |
| S9 | Aspherical | −3.6466 | 0.2914 | 1.67 | 20.4 | −1.87 | 10.6403 |
| S10 | Aspherical | 1.9545 | 0.0129 | | | | −31.0610 |
| S11 | Aspherical | 3.2508 | 0.8911 | 1.55 | 56.1 | 1.93 | −70.7281 |
| S12 | Aspherical | −1.4098 | 0.3828 | | | | −0.1269 |
| S13 | Aspherical | 0.6700 | 0.2963 | 1.54 | 55.7 | 53.65 | −3.0283 |
| S14 | Aspherical | 0.5800 | 0.4667 | | | | −2.0271 |
| S15 | Spherical | Infinite | 0.3000 | 1.52 | 64.2 | | |
| S16 | Spherical | Infinite | 0.1500 | | | | |
| S17 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 7.4960E−02 | −4.0200E−02 | 1.5347E−02 | −4.0300E−03 | 7.2600E−04 | −8.9000E−05 | 7.0200E−06 | −3.3000E−07 | 6.7500E−09 |
| S2 | 2.6750E−01 | −2.2177E−01 | 1.0496E−01 | 1.2160E−03 | −1.6880E−02 | 7.5730E−03 | −9.1000E−03 | 5.5860E−03 | −1.0700E−03 |
| S3 | 2.2460E−02 | −1.1915E−01 | 3.6142E−01 | −5.9214E−01 | 5.6608E−01 | −3.3065E−01 | 1.1705E−01 | −2.3180E−02 | 1.9740E−03 |
| S4 | −1.1733E−01 | 1.1726E+00 | −4.8075E+00 | 1.1191E+01 | −1.5920E+01 | 1.4075E+01 | −7.5541E+00 | 2.2514E+00 | −2.8568E−01 |
| S5 | −7.8020E−02 | 1.2473E+00 | −5.1229E+00 | 1.2885E+01 | −2.8677E+01 | 7.0780E+01 | −1.3099E+02 | 1.3187E+02 | −5.3805E+01 |
| S6 | 1.7491E−01 | 9.1409E−02 | 4.5086E+00 | −5.4352E+01 | 3.4122E+02 | −1.0758E+03 | 1.5396E+03 | −2.9001E+02 | −9.9084E+02 |
| S7 | 8.7236E−02 | −9.1246E−01 | 1.4498E+01 | −1.3717E+02 | 7.8918E+02 | −2.8335E+03 | 6.2042E+03 | −7.5862E+03 | 3.9690E+03 |
| S8 | −3.5576E−01 | 4.7921E−01 | 2.8087E+00 | −3.6866E+01 | 1.7678E+02 | −5.0216E+02 | 8.8078E+02 | −8.6259E+02 | 3.5432E+02 |
| S9 | −9.6647E−01 | 1.8037E+00 | −1.1396E+00 | −2.2756E+01 | 1.4479E+02 | −5.0686E+02 | 1.0427E+03 | −1.1203E+03 | 4.8077E+02 |
| S10 | −5.2996E−01 | 9.5404E−01 | −3.9930E−01 | −3.7896E+00 | 1.2436E+01 | −1.9491E+01 | 1.7440E+01 | −8.5158E+00 | 1.7749E+00 |
| S11 | −3.0562E−01 | 6.5314E−01 | −3.1448E−01 | −3.0216E+00 | 1.0746E+01 | −1.7289E+01 | 1.5148E+01 | −7.0048E+00 | 1.3353E+00 |
| S12 | −4.5459E−01 | 1.8403E+00 | −4.6205E+00 | 8.5449E+00 | −1.1058E+01 | 9.4939E+00 | −5.0071E+00 | 1.4478E+00 | −1.7484E−01 |
| S13 | −3.3573E−01 | 6.8559E−02 | −1.9547E−01 | 6.2994E−01 | −8.1713E−01 | 5.2842E−01 | −1.8175E−01 | 3.1956E−02 | −2.2700E−03 |
| S14 | −3.3811E−01 | 2.0802E−01 | −5.6000E−02 | −7.5000E−03 | 9.0040E−03 | −2.0700E−03 | 8.7800E−05 | 2.7200E−05 | −2.8000E−06 |

Figure 14A:
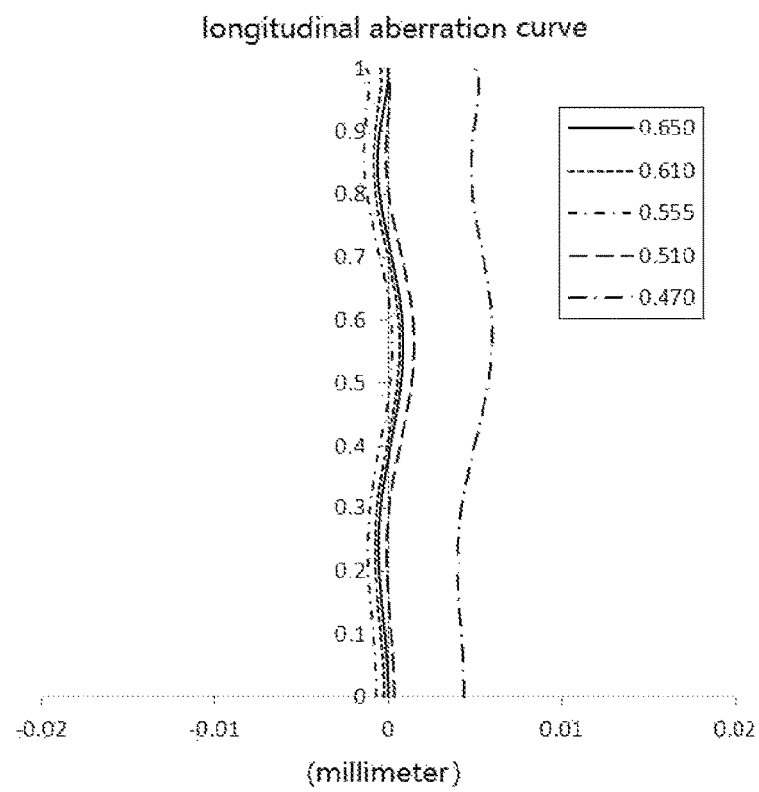
FIG. 14A to FIG. 14D show a longitudinal aberration curve, an astigmatism curve, a distortion curve and a lateral color curve of an optical imaging lens according to embodiment 7 respectively.
Figure 14B:
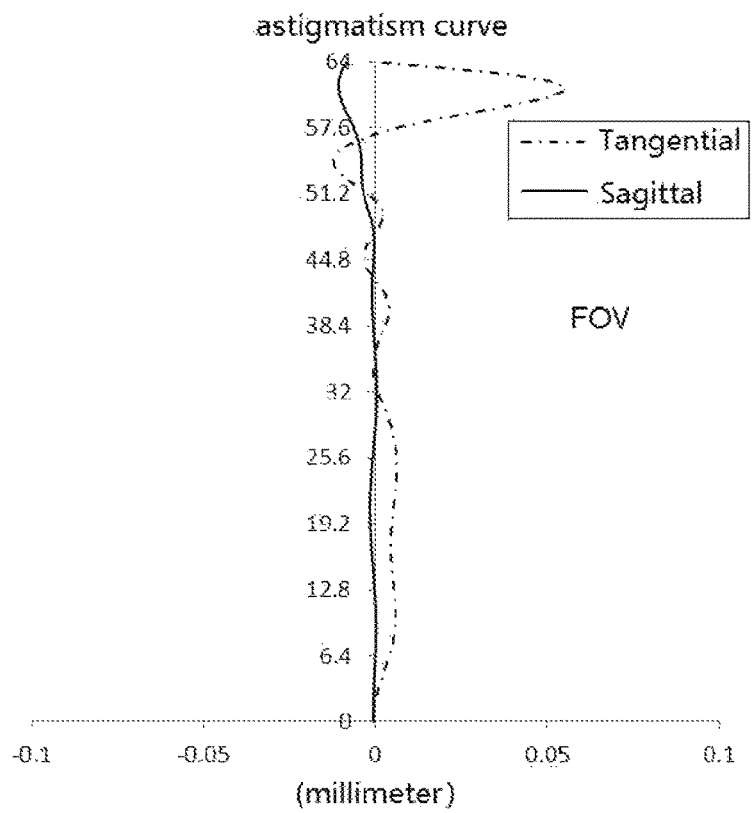
Figure 14C:
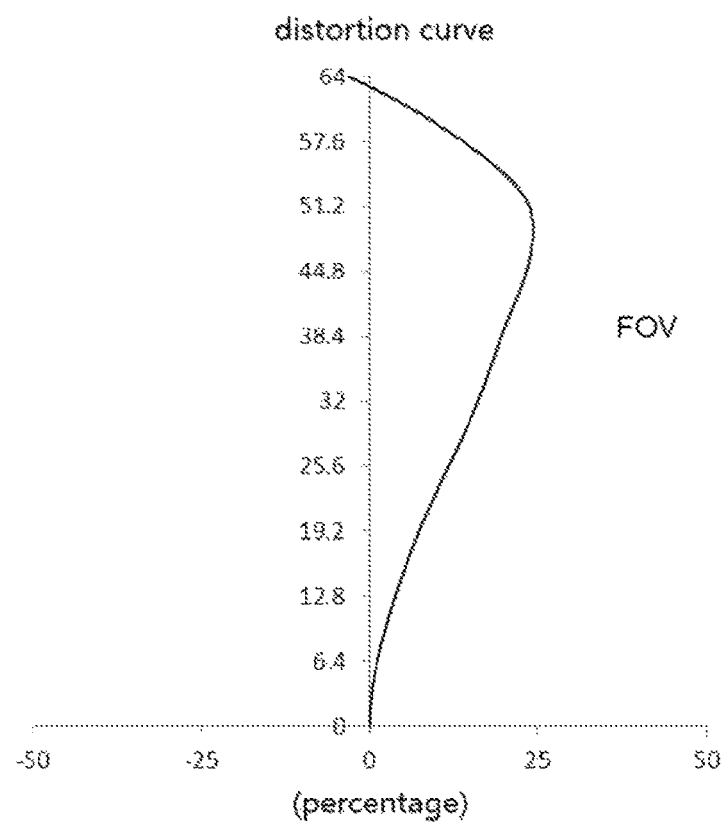
Figure 14D:
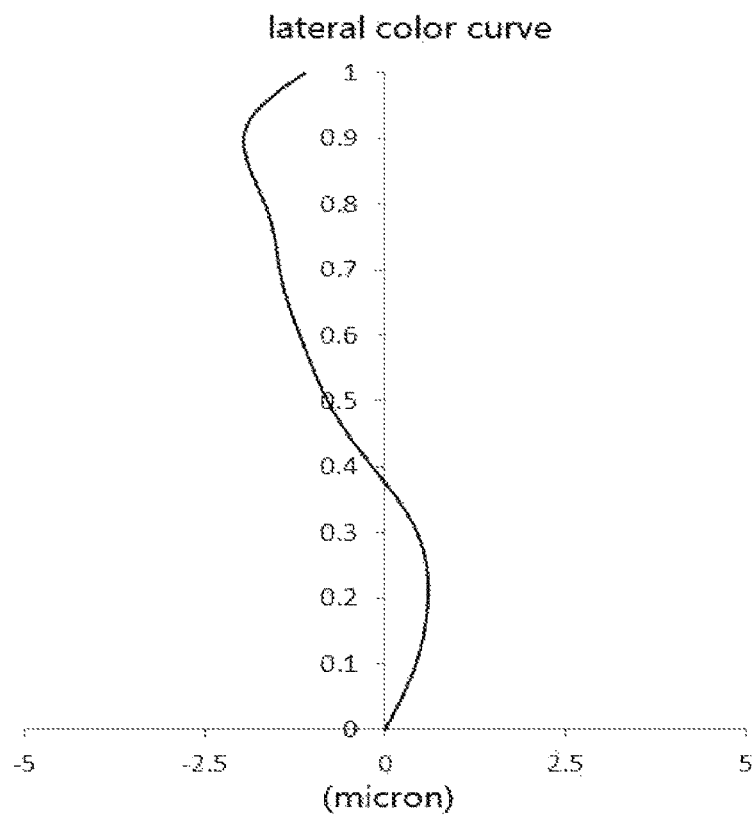

FIG. 14A illustrates a longitudinal aberration curve of the optical imaging lens according to embodiment 7 to represent deviation of a convergence focal point after light with different wavelengths passes through the lens. FIG. 14B illustrates an astigmatism curve of the optical imaging lens according to embodiment 7 to represent a meridian image surface curvature and a sagittal image surface curvature. FIG. 14C illustrates a distortion curve of the optical imaging lens according to embodiment 7 to represent distortion values corresponding to different FOVs. FIG. 14D illustrates a lateral color curve of the optical imaging lens according to embodiment 7 to represent deviation of different image heights on the imaging surface after the light passes through the lens. According to FIG. 14A to FIG. 14D, it can be seen that the optical imaging lens provided in embodiment 7 may achieve high imaging quality.

Embodiment 8

Figure 15:
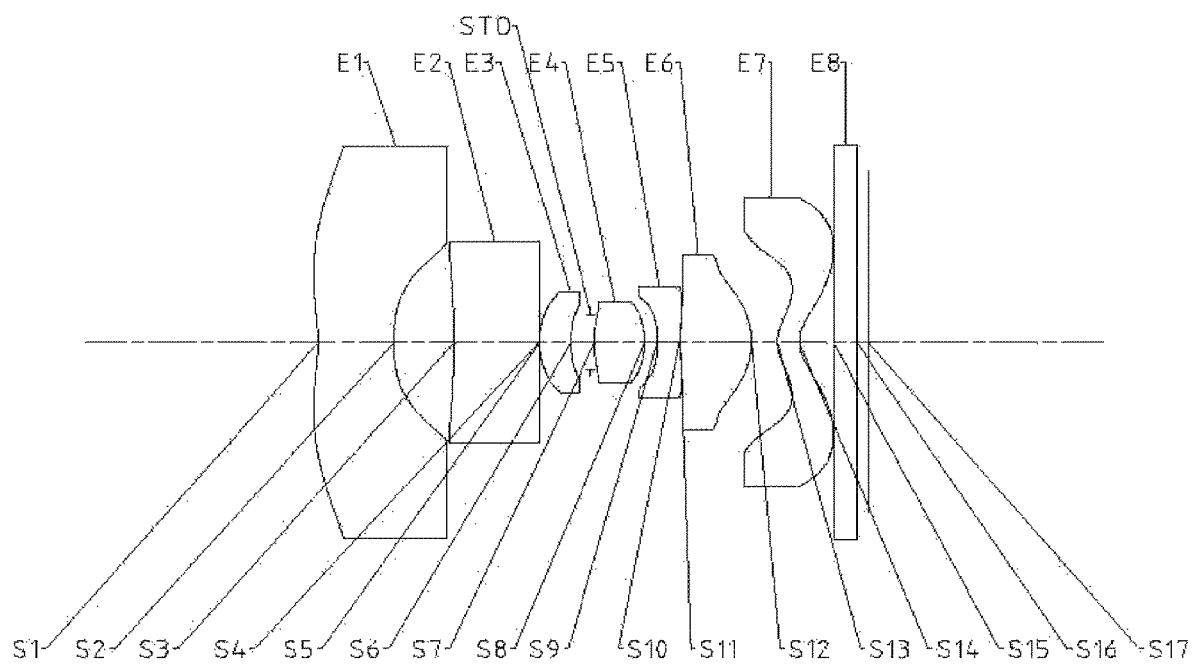
FIG. 15 shows a structure diagram of an optical imaging lens according to embodiment 8 of the disclosure.
Figure 16A:
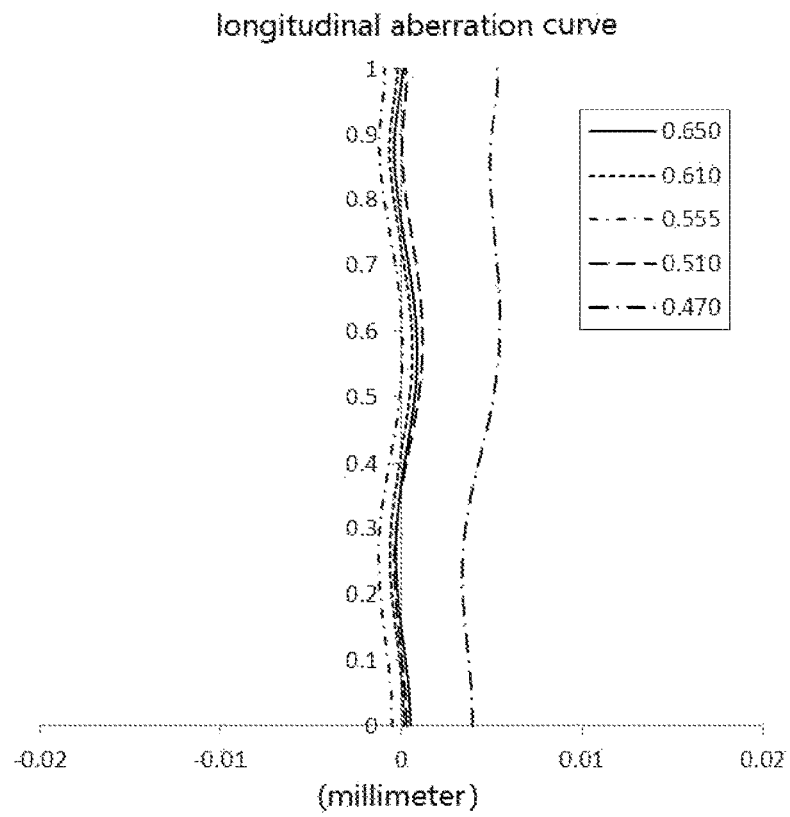
FIG. 16A to FIG. 16D show a longitudinal aberration curve, an astigmatism curve, a distortion curve and a lateral color curve of an optical imaging lens according to embodiment 8 respectively.
Figure 16B:
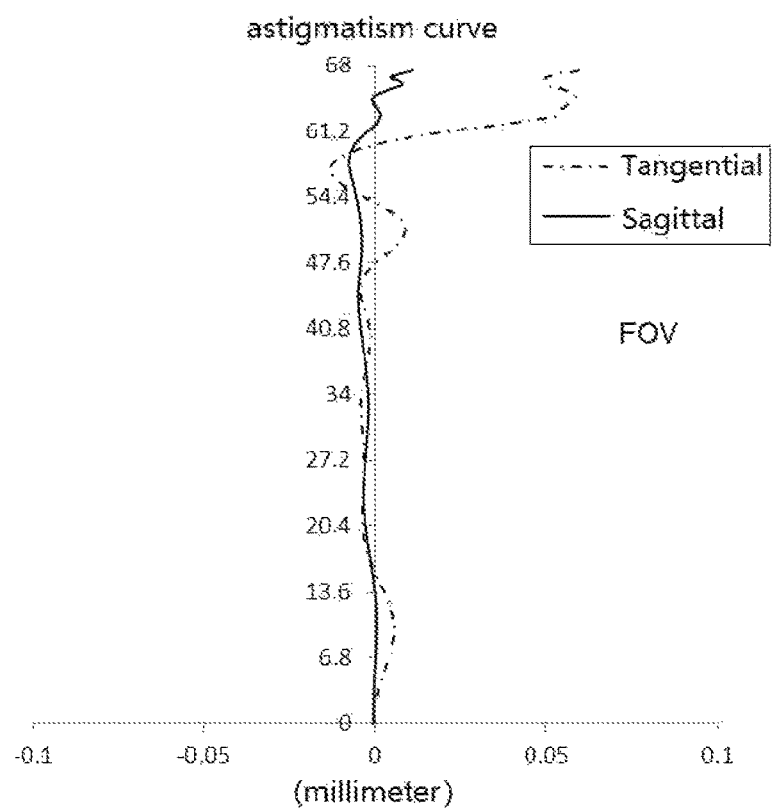
Figure 16C:
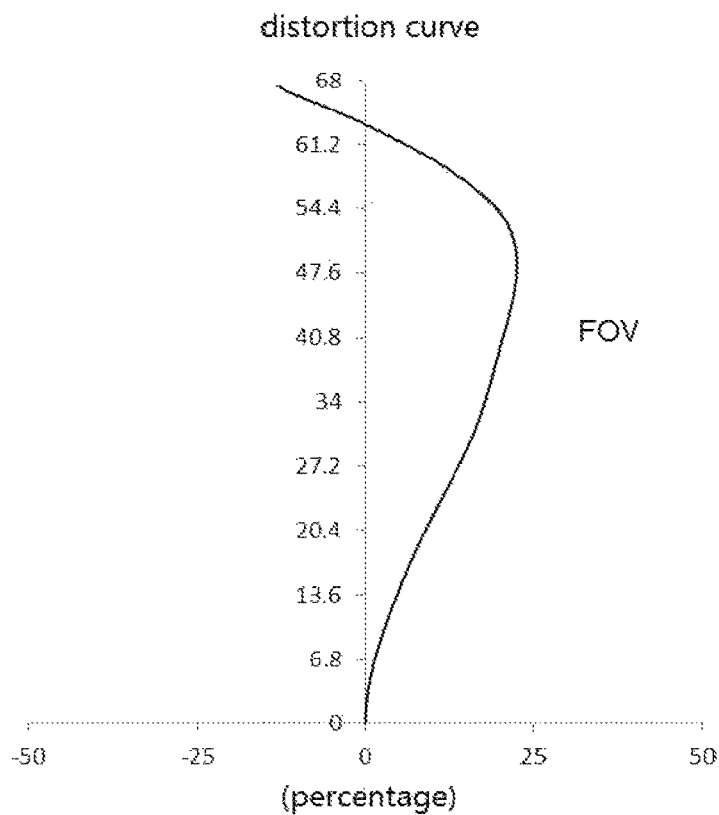
Figure 16D:
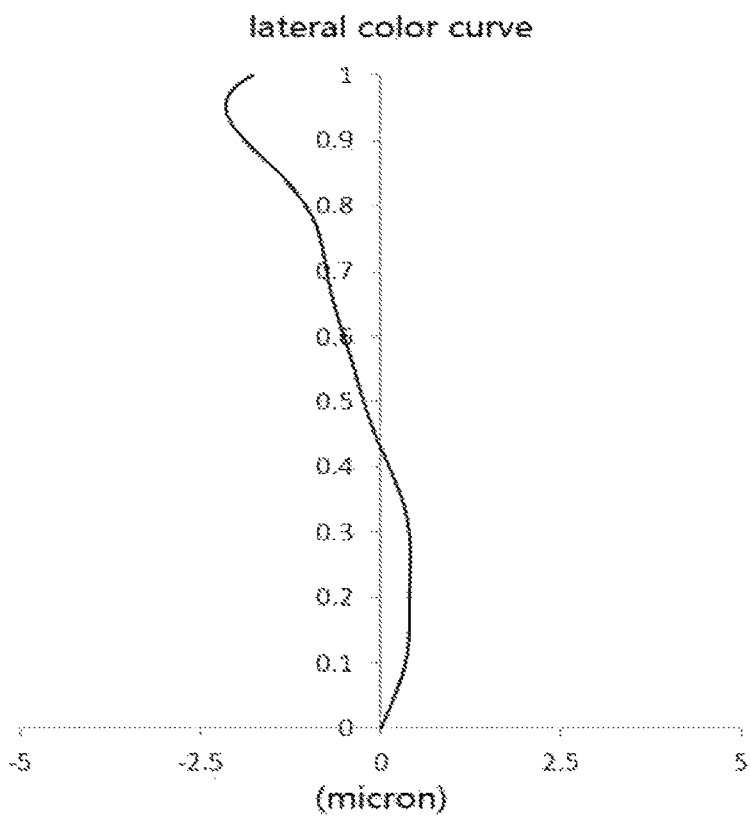

The optical imaging lens according to embodiment 8 of the disclosure will be described below with reference to FIG. 15 to FIG. 16D. FIG. 15 is a structure diagram of the optical imaging lens according to embodiment 8 of the disclosure.

As shown in FIG. 15, an optical imaging lens sequentially includes from an object side to an image side along an optical axis: a first lens E1, a second lens E2, a third lens E3, a diaphragm STO, a fourth lens E4, a fifth lens E5, a sixth lens E6, a seventh lens E7 and an optical filter E8.

The first lens E1 has a negative focal power, an object-side surface S1 thereof is a concave surface, and an image-side surface S2 is a concave surface. The second lens E2 has a negative focal power, an object-side surface S3 thereof is a concave surface, and an image-side surface S4 is a convex surface. The third lens E3 has a positive focal power, an object-side surface S5 thereof is a convex surface, and an image-side surface S6 is a concave surface. The fourth lens E4 has a positive focal power, an object-side surface S7 thereof is a convex surface, and an image-side surface S8 is a convex surface. The fifth lens E5 has a negative focal power, an object-side surface S9 thereof is a concave surface, and an image-side surface S10 is a concave surface. The sixth lens E6 has a positive focal power, an object-side surface S11 thereof is a convex surface, and an image-side surface S12 is a convex surface. The seventh lens E7 has a positive focal power, an object-side surface S13 thereof is a convex surface, and an image-side surface S14 is a concave surface. The optical filter E8 has an object-side surface S15 and an image-side surface S16. The optical imaging lens is provided with an imaging surface S17. Light from an object sequentially penetrates through each of the surfaces S1 to S16 and is finally imaged on the imaging surface S17.

In the embodiment 8, the total effective focal length f of the optical imaging lens is 1.24 mm, the on-axis distance TTL from the object-side surface S1 of the first lens E1 to the imaging surface S17 is 7.06 mm, and ImgH is the half of the length of the diagonal line in the effective pixel region on the imaging surface S17, ImgH is 2.57 mm.

Table 15 shows basic parameters of the optical imaging lens of embodiment 8, in which the units of curvature radius, thickness/distance and focal length are millimeter (mm). Table 16 shows high-order coefficients applied to each aspherical mirror surface in embodiment 8. A surface type of each aspherical surface may be defined by formula (1) given in embodiment 1.

TABLE 15

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspherical | −2.9000 | 0.9693 | 1.54 | 55.7 | −3.17 | −33.0115 |
| S2 | Aspherical | 4.5993 | 0.7688 | | | | 7.6280 |
| S3 | Aspherical | −11.5296 | 1.0869 | 1.65 | 23.5 | −21.07 | −81.2161 |
| S4 | Aspherical | −80.0000 | 0.0100 | | | | −99.0000 |
| S5 | Aspherical | 1.4707 | 0.4014 | 1.65 | 23.5 | 5.87 | 1.4411 |
| S6 | Aspherical | 2.1500 | 0.2599 | | | | 5.6386 |
| STO | Spherical | Infinite | 0.0467 | | | | |
| S7 | Aspherical | 2.3188 | 0.6395 | 1.55 | 56.1 | 1.82 | −1.4577 |
| S8 | Aspherical | −1.5657 | 0.1680 | | | | 1.3829 |
| S9 | Aspherical | −3.1764 | 0.2832 | 1.67 | 20.4 | −1.74 | 11.7937 |
| S10 | Aspherical | 1.8897 | 0.0110 | | | | −32.1873 |
| S11 | Aspherical | 2.9881 | 0.9114 | 1.55 | 56.1 | 1.91 | −54.2440 |
| S12 | Aspherical | −1.4331 | 0.3303 | | | | −0.1440 |
| S13 | Aspherical | 0.6700 | 0.2781 | 1.54 | 55.7 | 101.58 | −3.1615 |
| S14 | Aspherical | 0.5800 | 0.4431 | | | | −1.9921 |
| S15 | Spherical | Infinite | 0.3000 | 1.52 | 64.2 | | |
| S16 | Spherical | Infinite | 0.1500 | | | | |
| S17 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | 8.0957E−02 | −4.5250E−02 | 1.7375E−02 | −4.5800E−03 | 8.3100E−04 | −1.0000E−04 | 8.3400E−06 | −4.0000E−07 | 8.4100E−09 |
| S2 | 2.6317E−01 | −1.7063E−01 | −6.4180E−02 | 2.6615E−01 | −2.7871E−01 | 1.7298E−01 | −7.0970E−02 | 1.7536E−02 | −1.9400E−03 |
| S3 | 2.8319E−02 | −1.2397E−01 | 3.1044E−01 | −4.5355E−01 | 4.1146E−01 | −2.3742E−01 | 8.5030E−02 | −1.7280E−02 | 1.5230E−03 |
| S4 | −4.7720E−02 | 5.9363E−01 | −2.9093E+00 | 8.4286E+00 | −1.5000E+01 | 1.6618E+01 | −1.1243E+01 | 4.2694E+00 | −7.0017E−01 |
| S5 | −2.3940E−02 | 4.9443E−01 | −1.7218E+00 | 2.0957E+00 | 7.6661E−01 | 1.5160E+01 | −7.7237E+01 | 1.1937E+02 | −6.3344E+01 |
| S6 | 1.9091E−01 | −7.6800E−01 | 2.1579E+01 | −2.7349E+02 | 2.1187E+03 | −9.9192E+03 | 2.7709E+04 | −4.2536E+04 | 2.7653E+04 |
| S7 | 1.0569E−01 | −1.8784E+00 | 3.8399E+01 | −4.6668E+02 | 3.4889E+03 | −1.6346E+04 | 4.6693E+04 | −7.4264E+04 | 5.0313E+04 |
| S8 | −3.9165E−01 | 1.2024E+00 | −5.8660E+00 | 2.0129E+01 | −7.5069E+01 | 2.8001E+02 | −7.3428E+02 | 1.0854E+03 | −6.7251E+02 |
| S9 | −1.0800E+00 | 3.3840E+00 | −1.6270E+01 | 7.9518E+01 | −3.5086E+02 | 1.0891E+03 | −2.1182E+03 | 2.3468E+03 | −1.1302E+03 |
| S10 | −5.2853E−01 | 9.8702E−01 | −2.4425E−01 | −4.9415E+00 | 1.4359E+01 | −1.9106E+01 | 1.3179E+01 | −4.1471E+00 | 3.2404E−01 |
| S11 | −2.6768E−01 | 3.2316E−01 | 1.2987E+00 | −8.0188E+00 | 2.0495E+01 | −2.9126E+01 | 2.3782E+01 | −1.0451E+01 | 1.9105E+00 |
| S12 | −4.2757E−01 | 1.8021E+00 | −4.3859E+00 | 7.5437E+00 | −9.0212E+00 | 7.2685E+00 | −3.6620E+00 | 1.0236E+00 | −1.2030E−01 |
| S13 | −3.3680E−01 | 2.8231E−02 | −1.3868E−01 | 6.0415E−01 | −8.2680E−01 | 5.4507E−01 | −1.8933E−01 | 3.3473E−02 | −2.3800E−03 |
| S14 | −3.6267E−01 | 2.1226E−01 | −3.7090E−02 | −2.9640E−02 | 2.1648E−02 | −6.3800E−03 | 9.7000E−04 | −7.2000E−05 | 1.9100E−06 |

FIG. 1A illustrates a longitudinal aberration curve of the optical imaging lens according to embodiment 8 to represent deviation of a convergence focal point after light with different wavelengths passes through the lens. FIG. 16B illustrates an astigmatism curve of the optical imaging lens according to embodiment 8 to represent a meridian image surface curvature and a sagittal image surface curvature. FIG. 16C illustrates a distortion curve of the optical imaging lens according to embodiment 8 to represent distortion values corresponding to different FOVs. FIG. 16D illustrates a lateral color curve of the optical imaging lens according to embodiment 8 to represent deviation of different image heights on the imaging surface after the light passes through the lens. According to FIG. 16A to FIG. 16D, it can be seen that the optical imaging lens provided in embodiment 8 may achieve high imaging quality.

To sum up, embodiment 1 to embodiment 8 meet the relationship shown in Table 17 respectively.

TABLE 17

| Conditional expressions\embodiments | 1 | 2 | 3 | 4 | 5 | 6 | 7 | 8 |
|---|---|---|---|---|---|---|---|---|
| FOV (°) | 110.4 | 105.0 | 114.0 | 117.0 | 120.0 | 125.1 | 128.1 | 135.0 |
| (f1 + f5)/(R1 − R5) | 1.24 | 1.22 | 1.24 | 1.19 | 1.19 | 1.16 | 1.14 | 1.12 |
| (f4 + f6)/f | 2.66 | 2.55 | 2.86 | 2.95 | 2.94 | 3.05 | 2.95 | 3.02 |
| f3/(R5 + R6) | 1.55 | 2.27 | 1.75 | 1.37 | 1.32 | 1.73 | 1.59 | 1.62 |
| (R11 + R12)/(R13 + R14) | 1.25 | 0.88 | 0.52 | 0.21 | 0.34 | 1.47 | 1.47 | 1.24 |
| CT1/(CT2 + CT3) | 0.73 | 1.07 | 0.86 | 0.98 | 0.98 | 0.76 | 0.76 | 0.65 |
| SL/TTL | 0.60 | 0.58 | 0.53 | 0.50 | 0.50 | 0.53 | 0.52 | 0.50 |
| f56/(R5 + f23) | 0.54 | 0.62 | 0.53 | 0.62 | 0.68 | 0.78 | 0.99 | 1.27 |
| SAG62/(SAG42 + SAG51) | 0.96 | 0.92 | 0.76 | 0.68 | 0.70 | 1.02 | 1.16 | 1.19 |
| (SAG72 − SAG71)/CT7 | 1.10 | 1.10 | 1.97 | 2.30 | 2.31 | 1.67 | 1.59 | 1.47 |
| DT11/(R5 + DT72) | 1.07 | 1.17 | 1.27 | 1.46 | 1.49 | 1.32 | 1.37 | 1.36 |

The disclosure further provides an imaging apparatus, which may include an electronic photosensitive component for imaging. The electronic photosensitive component may be a Charge Coupled Device (CCD) or a Complementary Metal Oxide Semiconductor (CMOS). The imaging apparatus may be an independent imaging device of a digital camera, and may also be an imaging module integrated to a mobile electronic device such as a mobile phone. The imaging apparatus is provided with the above-described optical imaging lens.

The above description is only description about the preferred embodiments of the disclosure and adopted technical principles. Those skilled in the art should know that the scope of present disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens, sequentially comprising from an object side to an image side along an optical axis:
a first lens having a negative focal power, and provided with an object-side surface, the object-side surface is concave surface;
a second lens having a focal power;
a third lens having a focal power;
a fourth lens having a positive focal power;
a fifth lens having a negative focal power, and provided with an image-side surface, the image-side surface is concave surface;
a sixth lens having a positive focal power; and
a seventh lens having a focal power,
wherein the object-side surface of the first lens to an image-side surface of the seventh lens comprise at least one aspherical surface; and
a maximum Field of View (FOV) of the optical imaging lens meets 105°≤FOV≤135°;
a central thickness CT1 of the first lens on the optical axis, a central thickness CT2 of the second lens on the optical axis, and a central thickness CT3 of the third lens on the optical axis meet 0.6<CT1/(CT2+CT3)<1.1.

2. The optical imaging lens as claimed in claim 1, wherein an effective focal length f1 of the first lens, an effective focal length f5 of the fifth lens, a curvature radius R1 of the object-side surface of the first lens and a curvature radius R5 of an object-side surface of the third lens meet 1.0<(f1+f5)/(R1−R5)<1.4.

3. The optical imaging lens as claimed in claim 1, wherein an effective focal length f4 of the fourth lens, an effective focal length f6 of the sixth lens, and a total effective focal length f of the optical imaging lens meet 2.5<(f4+f6)/f<3.2.

4. The optical imaging lens as claimed in claim 1, wherein an effective focal length f3 of the third lens, a curvature radius R5 of an object-side surface of the third lens and a curvature radius R6 of an image-side surface of the third lens meet 1.3<f3/(R5+R6)<2.3.

5. The optical imaging lens as claimed in claim 1, wherein a curvature radius R11 of an object-side surface of the sixth lens, a curvature radius R12 of an image-side surface of the sixth lens, a curvature radius R13 of an object-side surface of the seventh lens, and a curvature radius R14 of an image-side surface of the seventh lens meet 0.2<(R11+R12)/(R13+R14)<1.5.

6. The optical imaging lens as claimed in claim 1, wherein the optical imaging lens further comprises a diaphragm disposed at the optical axis, and a distance SL on the optical axis from the diaphragm to an imaging surface of the optical imaging lens and a distance TTL on the optical axis from the object-side surface of the first lens to the imaging surface meet 0.4<SL/TTL<0.7.

7. The optical imaging lens as claimed in claim 1, wherein a synthetic focal length f23 for the second lens and the third lens, and a synthetic focal length f56 for the fifth lens and the sixth lens meet 0.5<f56/f23<1.3.

8. The optical imaging lens as claimed in claim 1, wherein an on-axis distance SAG42 from an intersection between an image-side surface of the fourth lens and the optical axis to an effective radius vertex on the image-side surface of the fourth lens, an on-axis distance SAG51 from an intersection between an object-side surface of the fifth lens and the optical axis to an effective radius vertex on the object-side surface of the fifth lens, and an on-axis distance SAG62 from an intersection between an image-side surface of the sixth lens and the optical axis to an effective radius vertex on the image-side surface of the sixth lens meet 0.6<SAG62/(SAG42+SAG51)<1.2.

9. The optical imaging lens as claimed in claim 1, wherein a central thickness CT7 of the seventh lens on the optical axis, an on-axis distance SAG71 from an intersection between an object-side surface of the seventh lens and the optical axis to an effective radius vertex on the object-side surface of the seventh lens, and an on-axis distance SAG72 from an intersection between an image-side surface of the seventh lens and the optical axis to an effective radius vertex on the image-side surface of the seventh lens meet 1.0<(SAG72−SAG71)/CT7<2.4.

10. The optical imaging lens as claimed in claim 1, wherein an effective semi-diameter DT11 of the object-side surface of the first lens and an effective semi-diameter DT72 of an image-side surface of the seventh lens meet 1.0<DT11/DT72<1.5.

\* \* \* \* \*